(12) United States Patent
Xu et al.

(10) Patent No.: US 11,570,318 B2
(45) Date of Patent: Jan. 31, 2023

(54) PERFORMING GLOBAL IMAGE EDITING USING EDITING OPERATIONS DETERMINED FROM NATURAL LANGUAGE REQUESTS

(71) Applicant: Adobe Inc., San Jose, CA (US)

(72) Inventors: Ning Xu, Milpitas, CA (US); Jing Shi, Rochester, NY (US); Franck Dernoncourt, Sunnyvale, CA (US); Trung Bui, San Jose, CA (US)

(73) Assignee: Adobe Inc., San Jose, CA (US)

( * ) Notice: Subject to any disclaimer, the term of this patent is extended or adjusted under 35 U.S.C. 154(b) by 17 days.

(21) Appl. No.: 17/374,103

(22) Filed: Jul. 13, 2021

(65) Prior Publication Data

US 2022/0399017 A1    Dec. 15, 2022

Related U.S. Application Data

(60) Provisional application No. 63/208,914, filed on Jun. 9, 2021.

(51) Int. Cl.
*H04N 1/00* (2006.01)
*G06T 5/00* (2006.01)
*G06F 3/16* (2006.01)
*G06F 3/12* (2006.01)

(52) U.S. Cl.
CPC ....... *H04N 1/00403* (2013.01); *G06F 3/1253* (2013.01); *G06F 3/1258* (2013.01); *G06F 3/167* (2013.01); *G06T 5/009* (2013.01)

(58) Field of Classification Search
None
See application file for complete search history.

(56) References Cited

U.S. PATENT DOCUMENTS

2012/0179960 A1* 7/2012 Cok .................. H04N 1/00164
                                                           715/243
2019/0196698 A1* 6/2019 Cohen ................. G06F 3/04845

OTHER PUBLICATIONS

Jacob Andreas, Marcus Rohrbach, Trevor Darrell, and Dan Klein. Neural module networks. In CVPR, 2016.
(Continued)

*Primary Examiner* — Lennin R Rodriguezgonzalez
(74) *Attorney, Agent, or Firm* — Keller Preece PLLC

(57) ABSTRACT

The present disclosure relates to systems, methods, and non-transitory computer-readable media that utilize a neural network having a long short-term memory encoder-decoder architecture to progressively modify a digital image in accordance with a natural language request. For example, in one or more embodiments, the disclosed systems utilize a language-to-operation decoding cell of a language-to-operation neural network to sequentially determine one or more image-modification operations to perform to modify a digital image in accordance with a natural language request. In some cases, the decoding cell determines an image-modification operation to perform partly based on the previously used image-modification operations. The disclosed systems further utilize the decoding cell to determine one or more operation parameters for each selected image-modification operation. The disclosed systems utilize the image-modification operation(s) and operation parameter(s) to modify the digital image (e.g., by generating one or more modified digital images) via the decoding cell.

20 Claims, 11 Drawing Sheets

(56) References Cited

OTHER PUBLICATIONS

Dzmitry Bahdanau, Kyunghyun Cho, and Yoshua Bengio. Neural machine translation by jointly learning to align and translate. arXiv preprint arXiv:1409.0473, 2014.

Vladimir Bychkovsky, Sylvain Paris, Eric Chan, and Fredo Durand. Learning photographic global tonal adjustment with a database of input/output image pairs. In CVPR, 2011.

Yu Cheng, Zhe Gan, Yitong Li, Jingjing Liu, and Jianfeng Gao. Sequential attention gan for interactive image editing via dialogue. arXiv preprint arXiv:1812.08352, 2018.

Kyunghyun Cho, Bart Van Merrienboer, Caglar Gulcehre, Dzmitry Bahdanau, Fethi Bougares, Holger Schwenk, and Yoshua Bengio. Learning phrase representations using rnn encoder-decoder for statistical machine translation. arXiv preprint arXiv:1406.1078, 2014.

Hao Dong, Simiao Yu, Chao Wu, and Yike Guo. Semantic image synthesis via adversarial learning. In ICCV, 2017.

Alaaeldin El-Nouby, Shikhar Sharma, Hannes Schulz, Devon Hjelm, Layla El Asri, Samira Ebrahimi Kahou, Yoshua Bengio, and Graham W Taylor. Tell, draw, and repeat: Generating and modifying images based on continual linguistic instruction. In ICCV, 2019.

Malik Ghallab, Dana Nau, and Paolo Traverso. Automated planning and acting. Cambridge University Press, 2016.

Ronghang Hu, Jacob Andreas, Trevor Darrell, and Kate Saenko. Explainable neural computation via stack neural module networks. In ECCV, 2018.

Ronghang Hu, Jacob Andreas, Marcus Rohrbach, Trevor Darrell, and Kate Saenko. Learning to reason: End-to-end module networks for visual question answering. In ICCV, 2017.

Ronghang Hu, Marcus Rohrbach, Jacob Andreas, Trevor Darrell, and Kate Saenko. Modeling relationships in referential expressions with compositional modular networks. In CVPR, 2017.

Yuanming Hu, Hao He, Chenxi Xu, Baoyuan Wang, and Stephen Lin. Exposure: A white-box photo post-processing framework. ACM Transactions on Graphics (TOG), 37(2):1-17, 2018.

Phillip Isola, Jun-Yan Zhu, Tinghui Zhou, and Alexei A Efros. Image-to-image translation with conditional adversarial networks. In CVPR, 2017.

Justin Johnson, Bharath Hariharan, Laurens Van Der Maaten, Judy Hoffman, Li Fei-Fei, C Lawrence Zitnick, and Ross Girshick. Inferring and executing programs for visual reasoning. In ICCV, 2017.

Diederik P Kingma and Jimmy Ba. Adam: A method for stochastic optimization. arXiv preprint arXiv:1412.6980, 2014.

George Konidaris, Leslie Pack Kaelbling, and Tomas Lozano-Perez. From skills to symbols: Learning symbolic representations for abstract high-level planning. Journal of Artificial Intelligence Research, 61:215-289, 2018.

Bowen Li, Xiaojuan Qi, Thomas Lukasiewicz, and Philip HS Torr. Manigan: Text-guided image manipulation. InCVPR, 2020.

Ke Li, Tianhao Zhang, and Jitendra Malik. Diverse image synthesis from semantic layouts via conditional imle. In ICCV, 2019.

Daqing Liu, Hanwang Zhang, Feng Wu, and Zheng-Jun Zha. Learning to assemble neural module tree networks for visual grounding. InICCV, 2019.

Ramesh Manuvinakurike, Jacqueline Brixey, Trung Bui, Walter Chang, Doo Soon Kim, Ron Artstein, and Kallirroi Georgila. Edit me: A corpus and a framework for understanding natural language image editing. In Proceedings of the Eleventh International Conference on Language Resources and Evaluation (LREC 2018), 2018.

Ramesh Manuvinakurike, Trung Bui, Walter Chang, and Kallirroi Georgila. Conversational image editing: Incremental intent identification in a new dialogue task. In Proceedings of the 19th Annual SIGdial Meeting on Discourse and Dialogue, pp. 284-295, 2018.

Jiayuan Mao, Chuang Gan, Pushmeet Kohli, Joshua B. Tenenbaum, and Jiajun Wu. The Neuro-Symbolic Concept Learner: Interpreting Scenes, Words, and Sentences From Natural Supervision. InICLR, 2019.

Xiaofeng Mao, Yuefeng Chen, Yuhong Li, Tao Xiong, Yuan He, and Hui Xue. Bilinear representation for language-based image editing using conditional generative adversarial networks. InICASSP, 2019.

Drew McDermott, Malik Ghallab, Adele Howe, Craig Knoblock, Ashwin Ram, Manuela Veloso, Daniel Weld, and David Wilkins. Pddl-the planning domain definition language, 1998.

Seonghyeon Nam, Yunji Kim, and Seon Joo Kim. Text-adaptive generative adversarial networks: manipulating images with natural language. InNuerIPS, 2018.

John A Nelder and Roger Mead. A simplex method for function minimization.The computer journal, 7(4):308-313, 1965.

Jeffrey Pennington, Richard Socher, and Christopher D Manning. Glove: Global vectors for word representation. In EMNLP, 2014.

Stuart J Russell and Peter Norvig. Artificial intelligence: a modern approach. Malaysia; Pearson Education Limited, 2016 part 1.

Stuart J Russell and Peter Norvig. Artificial intelligence: a modern approach. Malaysia; Pearson Education Limited, 2016 part 2.

Stuart J Russell and Peter Norvig. Artificial intelligence: a modern approach. Malaysia; Pearson Education Limited, 2016 part 3.

Jing Shi, Ning Xu, Trung Bui, Franck Dernoncourt, Zheng Wen, and Chenliang Xu. A benchmark and baseline for language-driven image editing.arXiv preprint arXiv:2010.02330, 2020 part 1.

Jing Shi, Ning Xu, Trung Bui, Franck Dernoncourt, Zheng Wen, and Chenliang Xu. A benchmark and baseline for language-driven image editing.arXiv preprint arXiv:2010.02330, 2020 part 2.

David Silver, Guy Lever, Nicolas Heess, Thomas Degris, Daan Wierstra, and Martin Riedmiller. Deterministic policy gradient algorithms. 2014.

Ilya Sutskever, Oriol Vinyals, and Quoc V Le. Sequence to sequence learning with neural networks. In Advances in neural information processing systems, pp. 3104-3112, 2014.

Richard S Sutton and Andrew G Barto. Reinforcement learning: An introduction. MIT press, 2018 part 1.

Richard S Sutton and Andrew G Barto. Reinforcement learning: An introduction. MIT press, 2018 part 2.

Richard S Sutton and Andrew G Barto. Reinforcement learning: An introduction. MIT press, 2018 part 3.

Richard S Sutton and Andrew G Barto. Reinforcement learning: An introduction. MIT press, 2018 part 4.

Hai Wang, Jason D Williams, and SingBing Kang. Learning to globally edit images with textual description. arXiv preprint arXiv:1810.05786, 2018 part 1.

Hai Wang, Jason D Williams, and SingBing Kang. Learning to globally edit images with textual description. arXiv preprint arXiv:1810.05786, 2018 part 2.

Yuwen Xiong, Renjie Liao, Hengshuang Zhao, Rui Hu, Min Bai, Ersin Yumer, and Raquel Urtasun. Upsnet: A unified panoptic segmentation network. In Proceedings of the IEEE Conference on Computer Vision and Pattern Recognition, pp. 8818-8826, 2019.

Kexin Yi, Jiajun Wu, Chuang Gan, Antonio Torralba, Push-meet Kohli, and Josh Tenenbaum. Neural-symbolic vqa: Disentangling reasoning from vision and language understanding. In NeuIPS, 2018.

Licheng Yu, Zhe Lin, Xiaohui Shen, Jimei Yang, Xin Lu, Mohit Bansal, and Tamara L Berg. Mattnet: Modular attention network for referring expression comprehension. In CVPR, 2018.

Rafael C Gonzales and Richard E Woods. Digital image processing, 2002 part 1.

Rafael C Gonzales and Richard E Woods. Digital image processing, 2002 part 2.

Ian Goodfellow. Nips 2016 tutorial: Generative adversarial networks. arXiv preprint arXiv:1701.00160, 2016.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Christian Ledig, Lucas Theis, Ferenc Huszar, Jose Caballero, Andrew Cunningham, Alejandro Acosta, Andrew Aitken, Alykhan Tejani, Johannes Totz, Zehan Wang, et al. Photo-realistic single image super-resolution using a generative adversarial network. In CVPR, 2017.

Edgar Riba, Dmytro Mishkin, Daniel Ponsa, Ethan Rublee, and Gary Bradski. Kornia: an open source differentiable computer

(56) References Cited

OTHER PUBLICATIONS vision library for pytorch. In The IEEE Winter Conference on Applications of Computer Vision, pp. 3674-3683, 2020.
Ting-Chun Wang, Ming-Yu Liu, Jun-Yan Zhu, Andrew Tao, Jan Kautz, and Bryan Catanzaro. High-resolution image synthesis and semantic manipulation with conditional gans. In CVPR, 2018.
Ronald J Williams. Simple statistical gradient-following algorithms for connectionist reinforcement learning. Machine learning, 8(3-4):229-256, 1992.
Kamyar Nazeri, Eric Ng, Tony Joseph, Faisal Z Qureshi, and Mehran Ebrahimi. Edgeconnect: Generative image inpainting with adversarial edge learning. arXiv preprint arXiv:1901.00212, 2019.

* cited by examiner

|  | MA5k-Req | | | | GIER | | | |
| --- | --- | --- | --- | --- | --- | --- | --- | --- |
|  | L1↓ | SSIM↑ | FID↓ | $\sigma_{\times 10^2}$↑ | User↑ | L1↓ | SSIM↑ | FID↓ | $\sigma_{\times 10^2}$↑ | User↑ |
| Target | - | - | - | - | 3.5053 | - | - | - | - | 3.6331 |
| Input | 0.1190 | 0.7992 | 12.3714 | - | - | 0.1079 | 0.8048 | 49.6229 | - | - |
| Bilinear GAN [23] | 0.1559 | 0.4988 | 102.1330 | 0.8031 | 1.9468 | 0.1918 | 0.4395 | 214.7331 | 1.2164 | 1.7988 |
| Pix2pixAug [29] | 0.0928 | 0.7938 | 14.5538 | 0.5401 | 3.0957 | 0.1255 | 0.7293 | 74.7761 | 1.2251 | 2.5148 |
| SISGAN [8] | 0.0979 | 0.7938 | 30.9877 | 0.1659 | 2.8032 | 0.1180 | 0.7300 | 140.1495 | 0.0198 | 2.1243 |
| TAGAN [25] | 0.1335 | 0.5429 | 43.9463 | 1.5552 | 2.5691 | 0.1202 | 0.5777 | 112.4168 | 0.6073 | 2.4970 |
| GeNeVa [7] | 0.0933 | 0.7772 | 33.7366 | 0.6091 | 3.0851 | 0.1093 | 0.7492 | 87.0128 | 0.5732 | 2.7278 |
| RL | 0.1007 | 0.8283 | 7.4896 | 1.6175 | 3.1968 | 0.2286 | 0.3832 | 132.1785 | 0.3978 | 1.8462 |
| T2ONet | 0.0784 | 0.8459 | 6.7571 | 0.7190 | 3.3830 | 0.0997 | 0.8160 | 49.2049 | 0.6226 | 2.8994 |

Quantitative results on two test sets. $\sigma_{\times 10^2}$ means that the image variance has been scaled up 100 times.

*Fig. 7*

PERFORMING GLOBAL IMAGE EDITING USING EDITING OPERATIONS DETERMINED FROM NATURAL LANGUAGE REQUESTS

CROSS-REFERENCE TO RELATED APPLICATIONS

This application claims priority to and the benefit of U.S. Provisional Patent Application No. 63/208,914, filed Jun. 9, 2021, which is incorporated herein by reference in its entirety.

BACKGROUND

Recent years have seen significant advancement in hardware and software platforms for editing digital images. Indeed, as the use of digital images has become more ubiquitous in daily life (e.g., with the prevalence of image-capturing mobile devices and the popularity of social media), so have systems that implement various techniques for editing digital images. Many conventional systems have implemented streamlined techniques to improve the accessibility of image editing for those with little background knowledge or experience or for those who wish to make edits on mobile devices having small screens that would otherwise hinder the editing process. To illustrate, some conventional systems enable users to provide a vocalized request, and the systems can modify a digital image based on the request. Although conventional image editing systems offer such natural language-based editing, such systems are often inflexibly limited to certain image-editing contexts, utilize models that require large amounts of data and processing resources to train, and/or produce inaccurate results by generating modified digital images having undesirable artifacts.

SUMMARY

One or more embodiments described herein provide benefits and/or solve one or more problems in the art with systems, methods, and non-transitory computer-readable media that generate accurate modified digital images utilizing a flexible neural network architecture that performs editing operations in accordance with natural language requests. In particular, in one or more embodiments, a system utilizes a neural network that maps natural language-based editing requests to a series of editing operations. For instance, in some cases, the neural network includes an encoder-decoder architecture having a decoding cell that utilizes editing operations to progressively edit a digital image according to the comprehension of a corresponding editing request and visual editing feedback. In some implementations, the decoding cell selects an editing operation to perform from a set of pre-defined operations. Further, in some embodiments, the decoding cell determines parameters to implement with each selected editing operation. In this manner, the system utilizes a neural network that is more flexibly implemented in various image-editing contexts and efficiently reduces data consumption. Further, the system generates modified digital images that more accurately reflect the corresponding natural language request.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 7 illustrates a table reflecting experimental results regarding the effectiveness of the language-to-operation neural network utilized by the language-based image editing system in accordance with one or more embodiments;

DETAILED DESCRIPTION

Figure 1:
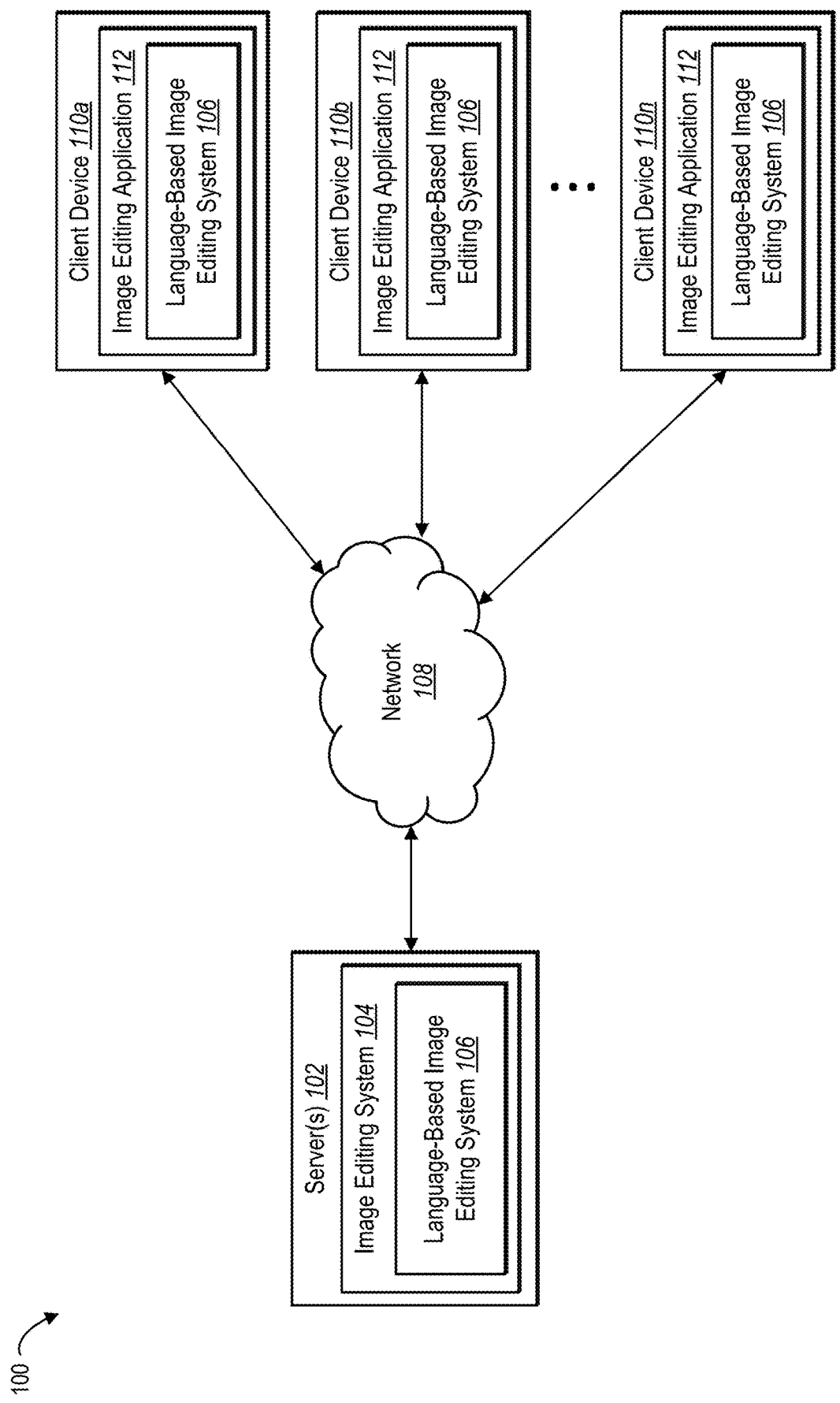
FIG. 1 illustrates an example environment in which a language-based image editing system can operate in accordance with one or more embodiments.

One or more embodiments described herein include a language-based image editing system that utilizes a flexible and efficient neural network having a decoding cell for modifying digital images accurately in accordance with natural language requests. Indeed, in one or more embodiments, the language-based image editing system utilizes a neural network having an encoder-decoder architecture that interprets a natural language request and modifies a digital image accordingly. In particular, in some implementations, the neural network includes a decoding cell that sequentially determines editing operations (and corresponding parameters) using the natural language request. In some cases, the decoding cell outputs the modified digital image by generating various intermediate digital images that sequentially incorporate the editing operations. Thus, the language-based image editing system generates a modified digital image having changes that reflect the natural language request.

To provide an illustration, in one or more embodiments, the language-based image editing system receives a digital image and a natural language request for modifying the digital image. The language-based image editing system further modifies the digital image in accordance with the natural language request by utilizing a language-to-operation decoding cell of a language-to-operation neural network. For example, the language-based image editing system utilizes an operation neural network layer of the language-to-operation decoding cell to determine an image-modification operation utilizing the digital image and the natural language request. The language-to-operation neural network also determines one or more operation parameters corresponding to the image-modification operation utilizing an operation-based neural network layer of the language-to-operation decoding cell. Additionally, the language-based image editing system utilizes an executor to generate a modified digital image by performing the image-modification operation on the digital image in accordance with the one or more operation parameters.

As just mentioned, in one or more embodiments, the language-based image editing system receives a digital image and a natural language request. In particular, in some embodiments, the natural language request includes a request to modify the digital image. In some implementations, the language-based image editing system receives the natural language request by receiving a verbal command or by receiving a textual request.

As further mentioned above, in one or more embodiments, the language-based image editing system utilizes a language-to-operation neural network to modify the digital image in accordance with the natural language request. In some cases, the language-to-operation neural network modifies the digital image using a sequence of one or more image-editing operations. In particular, the language-to-operation neural network determines one or more image-editing operations that modify the digital image in accordance with the natural language request. In some cases, the image-modification operations used by the language-to-operation neural network include common, pre-defined editing operations (e.g., a brightness operation, a saturation operation). Accordingly, the language-to-operation neural network modifies the digital image by performing the one or more image-modification operations on the digital image.

In some cases, the language-to-operation neural network further determines one or more operation parameters corresponding to the one or more image-modification operations. Indeed, in some implementations, the language-to-operation neural network determines at least one operation parameter for each of the image-modification operations selected for modifying the digital image. Thus, in some cases, to modify the digital image, the language-to-operation neural network performs the one or more image-modification parameters on the digital image in accordance with their respective operation parameter(s).

In some implementations, the language-to-operation neural network modifies the digital image by generating a sequence of one or more modified digital images. For instance, in some cases, the language-to-operation neural network generates a modified digital image for each selected image-modification operation. To illustrate, in some embodiments, the language-to-operation neural network determines a first image-modification operation (and at least one corresponding operation parameter) and performs the first image-modification operation on the digital image to generate a modified digital image. The language-to-operation neural network further determines a second image-modification operation (and at least one corresponding operation parameter) and performs the second image-modification operation on the modified digital image to generate an additional modified digital image. The additional modified digital image incorporates changes from the first and second image-modification operations. Thus, in some instances, the language-to-operation neural network progressively (e.g., iteratively) edits the digital image using a sequence of image-modification operations.

In some cases, the language-to-operation neural network determines an image-modification operation to perform based on a previously selected image-modification operation. To illustrate, in at least one implementation, the language-to-operation neural network determines a first image-modification operation and then determines a second image-modification operation at least partly based on the first image-modification operation. In some cases, the language-to-operation neural network further determines the second image-modification operation based on the modified digital image generated from the first image-modification operation.

In one or more embodiments, the language-to-operation neural network includes a long short-term memory neural network having an encoder-decoder architecture. For example, in some instances, the language-to-operation neural network includes a bi-directional long short-term memory encoder that extracts encoded request states from the natural language request. Further, the language-to-operation neural network includes a language-to-operation decoding cell that progressively (e.g., iteratively) edits the digital image using the encoded request states (e.g., by determining image-modification operations and corresponding operation parameters and generating one or more modified digital images using the image-modification operations and the operation parameters).

In one or more embodiments, the language-based image editing system provides the modified digital image for display within a graphical user interface of a client device. In some cases, the language-based image editing system further provides features that facilitate the interpretability of the changes made to the digital image. For instance, in some cases, the language-based image editing system provides, within the graphical user interface, visual elements that indicate the image-modification operations that were performed to generate the modified digital image (e.g., changes to brightness, changes to saturation). Further, in some cases, the language-based image editing system receives one or more user interactions via the graphical user interface and further edits the modified digital image based on the user interaction(s).

As mentioned, conventional image editing systems suffer from various shortcomings that result in inflexible, inefficient, and inaccurate operation. For example, conventional systems are typically limited in the context in which they can operate. To illustrate, many conventional systems implement models—such as rule-based models—that map language requests to executable editing operations (e.g., via sentence templates) for modifying a digital image. Such models, however, often cannot operate unless large amounts of annotated data (annotations regarding the editing operations performed) are available for training. These models can further struggle to implement vague editing requests.

Some conventional systems utilize a generative adversarial network (GAN) model, which implements a neural network to directly output a modified digital image based on image and language features. GAN-based models, however, are typically limited to editing low-resolution digital images. Further, GAN-based models often fail to modify digital images utilizing an interpretable approach (e.g., an approach that can be understood in terms of common editing operations). Thus, conventional systems implementing GAN-based models typically fail to provide features for interactively adjusting the modified digital image.

Additionally, conventional image editing systems often operate inefficiently. For example, models utilized to modify digital images, such as the GAN-based models, are often data-hungry, requiring large amounts of data for training and/or implementation. Accordingly, conventional systems that utilize GAN-based models consume a significant amount of computing resources, such as memory and processing power.

In addition to flexibility and efficiency concerns, conventional image editing systems can also operate inaccurately. In particular, many conventional systems fail to generate modified digital images that accurately incorporate the modifications associated with the natural language request. For instance, when modifying a digital image, GAN-based models typically introduce various artifacts. Thus, the modified digital image that is output by such models incorrectly portrays the requested changes or adds new artifacts.

The language-based image editing system provides several advantages over conventional systems. For example, the language-based image editing system operates more flexibly than conventional systems. In particular, the language-based image editing system is able to operate in a wider number of contexts. For instance, by using the language-to-operation neural network, the language-based image editing system provides practical implementation where annotated data is unavailable. Additionally, with use of the language-to-operation neural network, the language-based image editing system flexibly handles complex (e.g., vague) requests and high-resolution digital images. Indeed, the language-to-operation neural network is resolution independent and is able to generate a modified digital image that has the same resolution as the digital image received as input. Further, as the language-to-operation neural network utilizes, as the image-modification operations, common editing operations, the flexibly provides features understanding how a digital image was modified as well as features for manually editing the modified digital image further.

Further, the language-based image editing system operates more efficiently than conventional systems. Indeed, as discussed above, many conventional systems utilize models that consume large amounts of data for training and/or implementation. The language-to-operation neural network implemented by the language-based image editing system requires significantly less data. Accordingly, the language-based image editing system reduces the computing resources required to operate.

In addition to improving flexibility and efficiency, the language-based image editing system improves the accuracy with which modified digital images are generated. Indeed, by utilizing the language-to-operation neural network, the language-based image editing system generates modified digital images that accurately incorporate the modifications associated with the natural language request. For instances, the language-based image editing system generates modified digital images without introducing the artifacts that are commonly added by many models, such as GAN-based models.

Additional detail regarding the language-based image editing system will now be provided with reference to the figures. For example, FIG. 1 illustrates a schematic diagram of an exemplary system 100 in which a language-based image editing system 106 can operate. As illustrated in FIG. 1, the system 100 includes a server(s) 102, a network 108, and client devices 110a-110n.

Although the system 100 of FIG. 1 is depicted as having a particular number of components, the system 100 can have any number of additional or alternative components (e.g., any number of servers, client devices, or other components in communication with the language-based image editing system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 10). Moreover, the server(s) 102 and the client devices 110a-110n include computing devices such as those discussed in greater detail with relation to FIG. 10.

As mentioned above, the system 100 includes the server(s) 102. In one or more embodiments, the server(s) 102 generates, stores, receives, and/or transmits data including digital images and modified digital images. For example, in some embodiments, the server(s) 102 receives a digital image from a client device (e.g., one of the client devices 110a-110n) and transmits a modified digital image to the client device in return. In one or more embodiments, the server(s) 102 comprises a data server. In some implementations, the server(s) 102 comprises a communication server or a web-hosting server.

As shown in FIG. 1, the server(s) 102 includes an image editing system 104. In one or more embodiments, the image editing system 104 provides functionality by which a client device (e.g., one of the client devices 110a-110n) generates, edits, manages, and/or stores digital images. For example, in some instances, a client device sends a digital image to the image editing system 104 hosted on the server(s) 102 via the network 108. The image editing system 104 then provides many options that the client device may use to edit the digital image, store the digital image, and subsequently search for, access, and view the digital image.

Additionally, the server(s) 102 include the language-based image editing system 106. In particular, in one or more embodiments, the language-based image editing system 106 utilizes the server(s) 102 to generate modified digital images in accordance with natural language requests. For example, the language-based image editing system 106 can utilize the server(s) 102 to receive a digital image and a natural language request and generate a modified digital image in accordance with the natural language request.

To illustrate, in one or more embodiments, the language-based image editing system 106, via the server(s) 102, receives a digital image and a natural language request for modifying the digital image. Further, via the server(s) 102, the language-based image editing system 106 modifies the digital image in accordance with the natural language request utilizing a language-to-operation neural network. For example, in some implementations, via the server(s) 102, the language-based image editing system 106 utilizes the language-to-operation neural network to determine an image-modification operation utilizing the digital image and the natural language request. Additionally, via the server(s) 102, the language-based image editing system 106 utilizes the language-to-operation neural network to determine one or more operation parameters corresponding to the image-modification operation utilizing an operation-based neural network layer. Via the server(s) 102, the language-based image editing system 106 further utilizes the language-to-operation neural network to generate a modified digital image by performing the image-modification operation on the digital image in accordance with the one or more operation parameters.

In one or more embodiments, the client devices 110a-110n include computing devices that can display and/or modify digital images. For example, the client devices 110a-110n can include smartphones, tablets, desktop computers, laptop computers, head-mounted-display devices, and/or other electronic devices. In some instances, the client devices 110a-110n include one or more applications (e.g., the image editing application 112) that can display and/or modify digital images. For example, in one or more embodiments, the image editing application 112 includes a software application installed on the client devices 110a-110n. Additionally, or alternatively, the image editing application 112 includes a software application hosted on the server(s) 102 (and supported by the image editing system 104), which may be accessed by the client devices 110a-110n through another application, such as a web browser.

In particular, in some implementations, the language-based image editing system 106 on the server(s) 102 supports the language-based image editing system 106 on the client device 110n. For instance, the language-based image editing system 106 on the server(s) 102 learns parameters for the language-to-operation neural network. The language-based image editing system 106 then, via the server(s) 102, provides the language-to-operation neural network to the client device 110n. In other words, the client device 110n obtains (e.g., downloads) the language-to-operation neural network with the learned parameters from the server(s) 102. Once downloaded, the language-based image editing system 106 on the client device 110n can utilize the language-to-operation neural network to generate modified digital images in accordance with natural language requests independent from the server(s) 102.

In alternative implementations, the language-based image editing system 106 includes a web hosting application that allows the client device 110n to interact with content and services hosted on the server(s) 102. To illustrate, in one or more implementations, the client device 110n accesses a web page supported by the server(s) 102. The client device 110n provides a digital image and a natural language request to the server(s) 102, and, in response, the language-based image editing system 106 on the server(s) 102 generates a modified digital image in accordance with the natural language request. The server(s) 102 then provides the modified digital image to the client device 110n for display or further editing.

Indeed, the language-based image editing system 106 can be implemented in whole, or in part, by the individual elements of the system 100. Indeed, although FIG. 1 illustrates the language-based image editing system 106 implemented with regard to the server(s) 102, different components of the language-based image editing system 106 can be implemented by a variety of devices within the system 100. For example, one or more (or all) components of the language-based image editing system 106 can be implemented by a different computing device (e.g., one of the client devices 110a-110n) or a separate server from the server(s) 102 hosting the image editing system 104. Indeed, as shown in FIG. 1, the client devices 110a-110n include the language-based image editing system 106. Example components of the language-based image editing system 106 will be described below with regard to FIG. 8.

Figure 2:
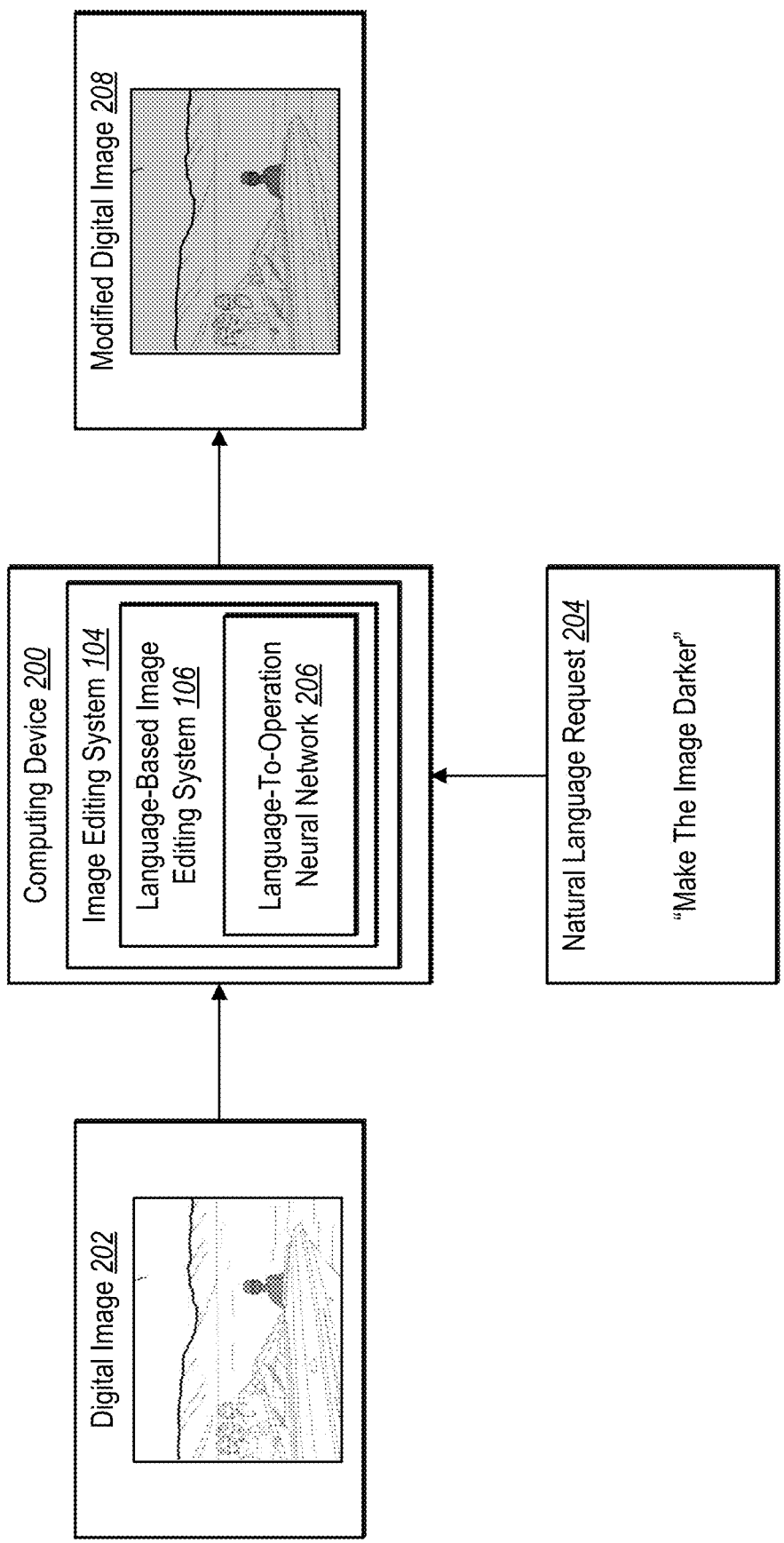
FIG. 2 illustrates an overview diagram of the language-based image editing system generating a modified digital image in accordance with one or more embodiments.

As mentioned above, in one or more embodiments, the language-based image editing system 106 modifies a digital image in accordance with a natural language request. FIG. 2 illustrates an overview diagram of the language-based image editing system 106 modifying a digital image in accordance with a natural language request in accordance with one or more embodiments.

As shown in FIG. 2, the language-based image editing system 106 receives a digital image. In one or more embodiments, a digital image includes an image composed of digital data. In particular, in some embodiments, a digital image includes a digital file that is made of digital image data and is displayable via a user interface. For example, in some implementations a digital image includes a digital photo, a digital rendering (e.g., a scan or other digital reproduction) of a photograph or other document, or a frame of a digital video. In some implementations, a digital image includes a digitally generated drawing, chart, map, graph, logo, or other graphic.

As further shown in FIG. 2, the language-based image editing system 106 also receives a natural language request 204. In one or more embodiments, a natural language request includes a request formed from, or formed to at least include, language associated with humans. In particular, in some embodiments, a natural language request includes a request that includes language typically associated with communication between humans. Indeed, a natural language request includes a request using language (e.g., words and phrases) that would typically be understandable to a human being.

In some cases, a natural language request includes a verbal command (i.e., a verbal request). In one or more embodiments, a verbal command includes a natural language request having an audible component. For example, in some instance, a verbal command includes a vocalized request (e.g., a request that is spoken). In some cases, a verbal command includes a sound that has been created to otherwise mimic or reproduced a vocalized request (e.g., a recording of a vocalized request or a digitally created sound meant to simulate a vocalized request).

In some implementations, a natural language request includes a textual request. In one or more embodiments, a textual request includes a natural language request having a textual component. For instance, in some implementations, a textual request includes a written or typed request.

In one or more embodiments, a natural language request includes a request to modify a digital image. For example, in some cases, a natural language request includes a request to perform one or more actions to modify the digital image. Indeed, as shown in FIG. 2, the natural language request 204 includes a request to darken the digital image 202.

In some instances, the language-based image editing system 106 receives the digital image 202 and the natural language request 204 separately. For example, in some cases, the language-based image editing system 106 receives the digital image 202 at a first time and receives the natural language request 204 at a second time that is later than the first time. In some cases, the language-based image editing system 106 receives the digital image 202 and the natural language request 204 together.

In some embodiments, the language-based image editing system 106 receives the digital image 202 by receiving an indication of the digital image 202. For instance, in some cases, the language-based image editing system 106 receives a storage location of the digital image 202, a file name of the digital image 202, or a selection of the digital image 202. Accordingly, the language-based image editing system 106 retrieves the digital image 202 based on the received indication. To illustrate, as shown in FIG. 2, in some instances, the language-based image editing system 106 operates on a computing device 200 (e.g., the server(s) 102 or one of the client devices 110a-110n discussed above with reference to FIG. 1 or some other mobile computing device, such as a smart phone or tablet). Accordingly, in some embodiments, the language-based image editing system 106 retrieves the digital image 202 by accessing the digital image 202 from local storage or from a remote storage location that is accessible to the computing device 200.

Additionally, as shown in FIG. 2, the language-based image editing system 106 utilizes a language-to-operation neural network 206 to analyze the digital image 202 and the natural language request 204. Generally, in one or more embodiments, a neural network includes a machine learning model that can be tuned (e.g., trained) based on inputs to approximate unknown functions used for generating the corresponding outputs. Indeed, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

More particularly, in one or more embodiments, a language-to-operation neural network includes a computer-implemented neural network that modifies digital images in accordance with natural language requests. Indeed, in some embodiments, a language-to-operation neural network includes a neural network that analyzes a digital image and a natural language request to modify the digital image. The language-to-operation neural network further modifies the digital image in accordance with the natural language request. For instance, in some implementations, the language-to-operation neural network progressively modifies the digital image by generating one or more modified digital images using one or more image-modification operations and corresponding operation parameters.

In some implementations, the language-to-operation neural network 206 includes a long short-term memory neural network. In some cases, the language-to-operation neural network 206 includes a neural network having an encoder-decoder architecture. To illustrate, in some implementations, the language-to-operation neural network 206 includes a bi-directional long short-term memory encoder. Further, the language-based image editing system 106 includes a language-to-operation decoding cell. The architecture of the language-to-operation neural network 206 will be discussed in more detail below.

As shown in FIG. 2, based on the analysis of the digital image 202 and the natural language request 204, the language-based image editing system 106 generates a modified digital image 208. In one or more embodiments, a modified digital image includes an edited digital image. For instance, in some cases, a modified digital image includes a digital image having one or more changes applied thereto in accordance with a natural language request. Indeed, as shown in FIG. 2, the modified digital image 208 includes one or more features resulting from modifications applied to darken the digital image 202 in accordance with the natural language request 204.

Figure 3:
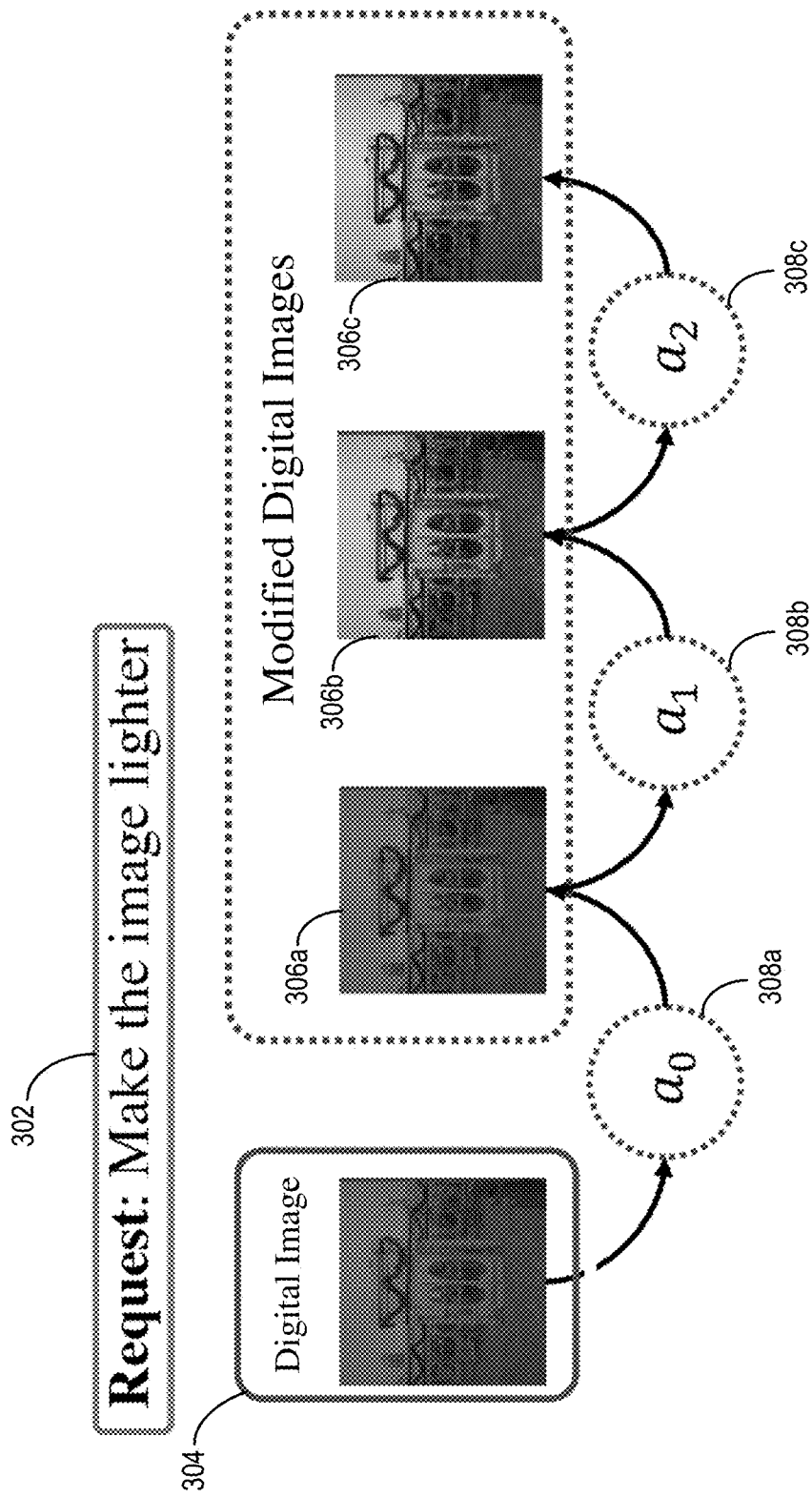
FIG. 3 illustrates a diagram for modifying a digital image by generating a sequence of modified digital images in accordance with one or more embodiments.

As mentioned above, in one or more embodiments, the language-based image editing system 106 progressively modifies a digital image in accordance with a natural language request. In particular, in some cases, the language-based image editing system 106 progressively modifies a digital image by generating a sequence of one or more modified digital images. FIG. 3 illustrates a diagram for modifying a digital image by generating a sequence of modified digital images in accordance with one or more embodiments.

Indeed, in some implementations, the language-based image editing system 106 utilizes a digital image $I_0$ and a natural language request Q to generate a modified digital image. In particular, the language-based image editing system 106 generates the modified digital image utilizing a sequence of modification actions $\{a_t\}_{t=0}^T$ with the sequence having length T+1. By applying modification action $a_t$ to digital image $I_t$, the language-based image editing system 106 generates modified digital image $I_{t+1}$. In some implementations, the language-based image editing system 106 ends the modification process at modification action $a_T$ (the END action, which does not provide a modification, in some cases, but signals that modification is complete). In some implementations, as will be discussed in more detail below, the language-based image editing system 106 defines a modification action as a=(o, a) where o represents a discrete image-modification operation and a represents one or more continuous operation parameters that correspond to the image-modification operation. In some cases, the language-based image editing system 106 selects deterministic modification actions as part of the sequence $\{a_t\}t=0^T$. In other words, the language-based image editing system 106 generates a unique modified digital image $I_{t+1}$ when applying the modification action $a_t$ to the digital image $I_t$.

To illustrate, as shown in FIG. 3, the language-based image editing system 106 receives a natural language request 302 and a digital image 304. As shown in FIG. 3, the natural language request 302 includes a request to lighten the digital image 304. As further shown in FIG. 3, the language-based image editing system 106 modifies the digital image 304 in accordance with the natural language request 302 by generating a sequence of modified digital images 306a-306c. In particular, the language-based image editing system 106 utilizes a language-to-operation neural network (not shown) to generate the sequence of modified digital images 306a-306c based on the natural language request 302.

As illustrated, the language-based image editing system 106 generates the sequence of the modified digital images 306a-306c utilizing a sequence of modification actions 308a-308c. As indicated above, in one or more embodiments, a modification action includes an image-modification operation for modifying a digital image. In some cases, a modification action further includes one or more operation parameters corresponding to an image-modification operation.

In one or more embodiments, an image-modification operation includes an operation that, when performed, modifies a digital image. In particular, in some implementations, an image-modification operation includes an action that changes at least one aspect, feature, or characteristics of a digital image. For example, in some cases, an image-modification operation includes an operation that changes how a digital image is portrayed or viewed, including, but not limited to, a brightness operation, a saturation operation, a contrast operation, a sharpness operation, a tone operation, or a color operation. In some instances, an image-modification operation changes what is portrayed in a digital image (e.g., by adding or removing objects or portions of objects portrayed in the digital image).

As mentioned, in some cases, an image-modification operation corresponds to one or more operation parameters. In one or more embodiments, an operation parameter includes a parameter that affects how an image-editing operation modifies a digital image. In particular, in some embodiments, an operation parameter includes a parameter that dictates the degree to which an image-modification operation changes one or more features of a digital image targeted by that image-modification operation. For instance, in some cases, an operation parameter increases or decreases the degree to which an image-modification operation changes one or more targeted features. In some instances, where an image-modification operation is associated with multiple operation parameters, each operation parameter controls a particular aspect of the image-modification operation.

As illustrated, the language-based image editing system 106 generates the modified digital image 306a utilizing the modification action 308a. In particular, the language-based image editing system 106 performs the modification action 308a on the digital image 304 to generate the modified digital image 306a (e.g., performs the image-modification operation of the modification action 308a utilizing the one or more corresponding operation parameters). Additionally, the language-based image editing system 106 generates the modified digital image 306b by performing the modification action 308b on the modified digital image 306a. Further, the language-based image editing system 106 generates the modified digital image 306c by performing the modification action 308c on the modified digital image 306b. Thus, in one or more embodiments, the language-based image editing system 106 (e.g., the language-to-operation neural network) outputs the modified digital image 306c in response to receiving the natural language request 302 and the digital image 304.

By generating the modified digital images 306a-306c, the language-based image editing system 106 progressively modifies the digital image 304 in accordance with the natural language request 302. To illustrate, in some implementations, by generating the modified digital image 306a, the language-based image editing system 106 progresses toward modifying the digital image 304 in accordance with the natural language request 302 though the modification process is not complete (e.g., the digital image 304 has not been modified in complete satisfaction of the natural language request 302). By generating the modified digital image 306b, the language-based image editing system 106 further progresses toward satisfaction of the natural language request 302. Further, by generating the modified digital image 306c, the language-based image editing system 106 completes the process to modify the digital image 304 in accordance with the natural language request 302.

Though FIG. 3 illustrates modifying a digital image by generating multiple modified digital images utilizing a sequence of multiple modification actions, the language-based image editing system 106 modifies a digital image utilizing a single modification action in some embodiments. In particular, the language-based image editing system 106 generates a single modified digital image by performing one image-modification operation utilizing one or more corresponding operation parameters. Thus, the language-based image editing system 106 is capable of implementing modification action sequences of various lengths.

Figure 4A:
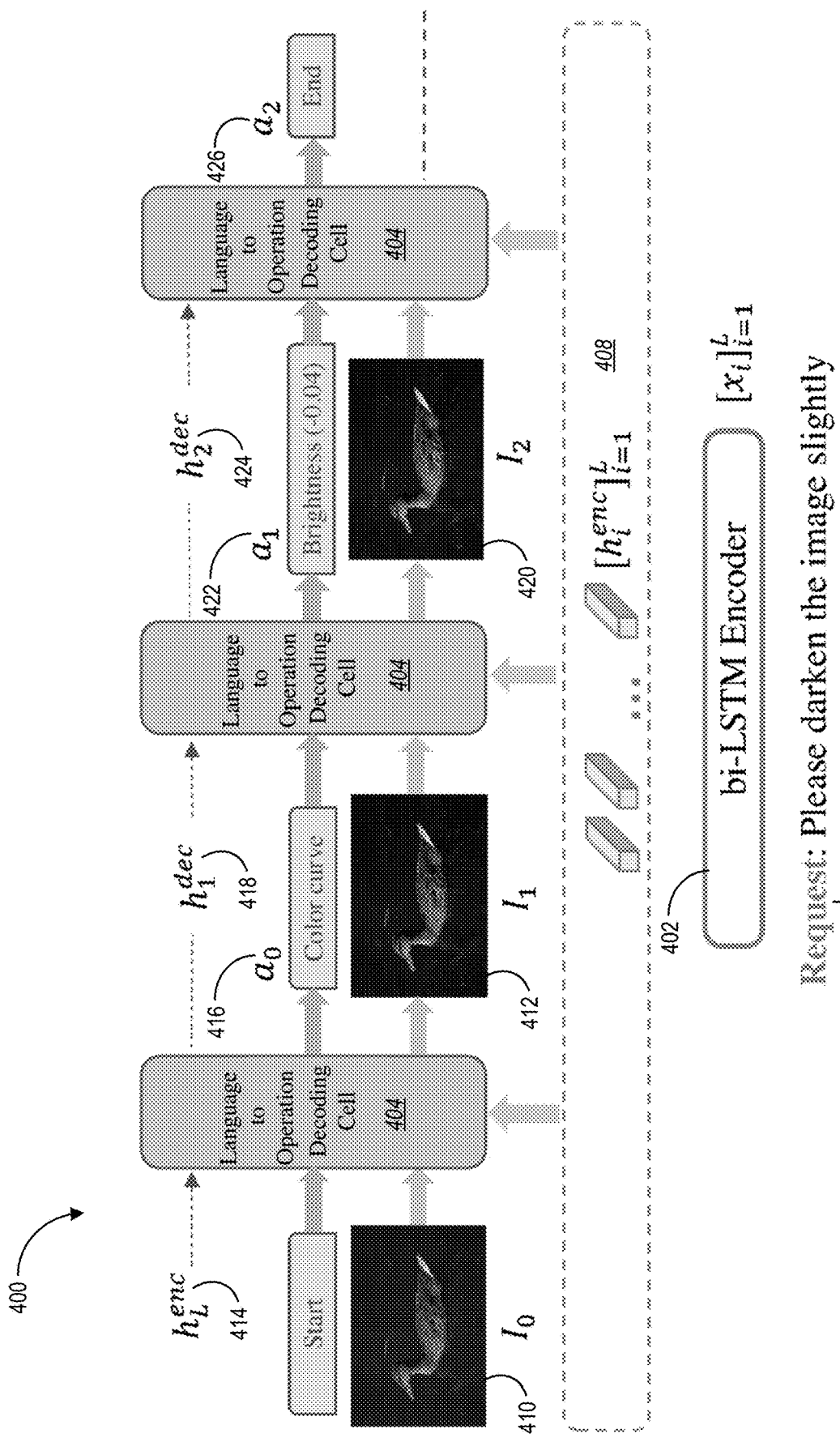
FIGS. 4A-4B illustrate the architecture of a language-to-operation neural network in accordance with one or more embodiments.
Figure 4B:
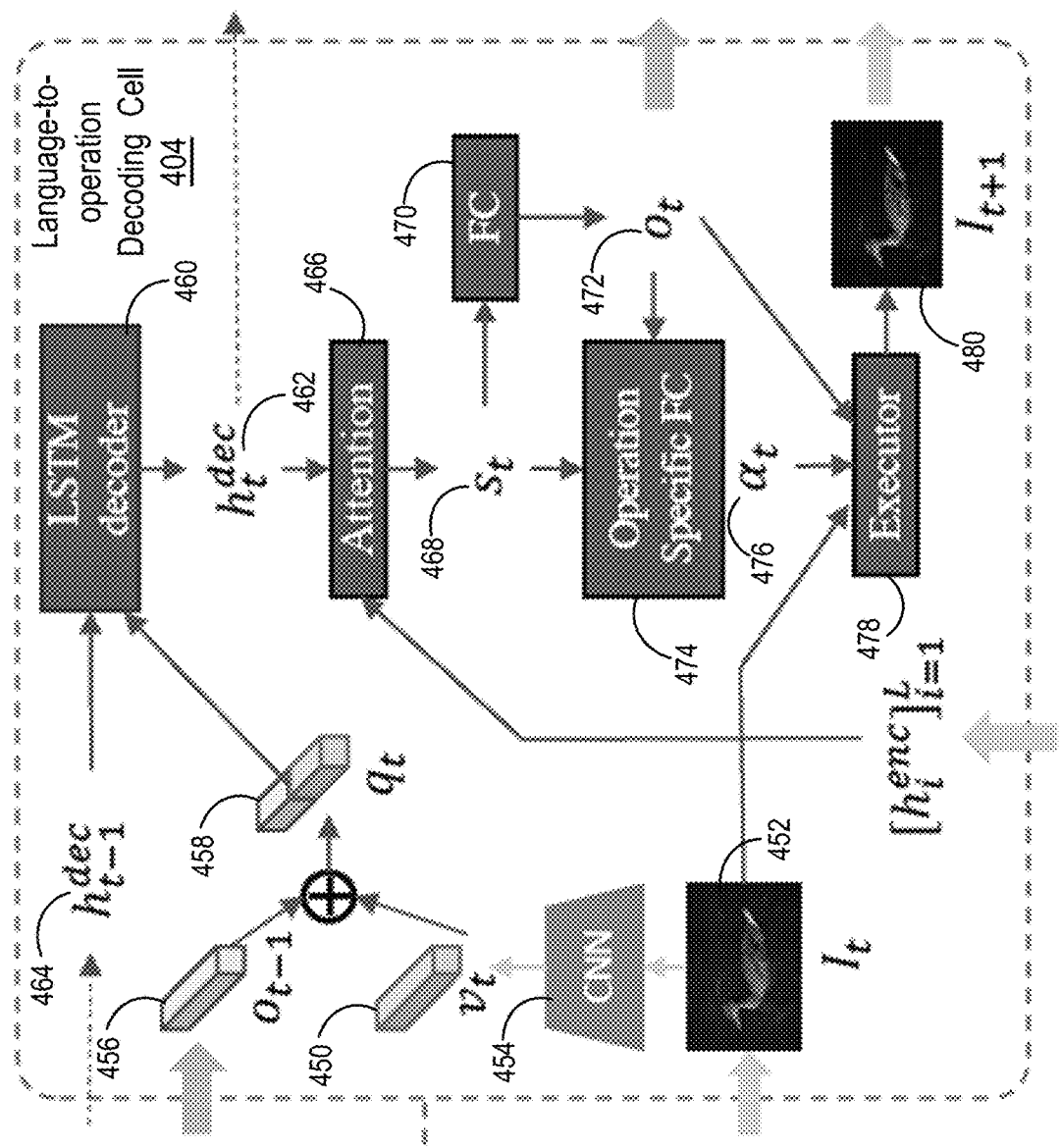

As discussed above, in one or more embodiments, the language-based image editing system 106 utilizes a language-to-operation neural network to modify a digital image in accordance with a natural language request. FIGS. 4A-4B illustrate a neural network architecture of a language-to-operation neural network in accordance with one or more embodiments. In particular, FIG. 4A illustrates an encoder-decoder architecture of a language-to-operation neural network in accordance with one or more embodiments. FIG. 4B illustrates an architecture of a decoding cell of the language-to-operation neural network of FIG. 4A in accordance with one or more embodiments.

As indicated above, in some implementations, the language-based image editing system 106 utilizes a language-to-operation neural network to map a natural language request and a digital image to a sequence of modification actions (e.g., image-modification operations and their corresponding parameter(s)). In some cases, the language-to-operation neural network determines a modification action to perform at a current time step based on previously used modification actions as well as the digital image (e.g., if the current time step is the first time step) or modified digital image generated from the previous time step (e.g., if the current time step is after the first time step). Thus, in one or more embodiments, the language-to-operation neural network maps the natural language request Q and the digital image $I_0$ to the sequence of modification actions $\{a_t\}_{t=0}^T$ as follows:

$$P(\{a_t\}_{t=0}^T \mid I_0, Q) = P(a_0 \mid I_0, Q) \times \prod_{t=1}^T P(a_t \mid \{a_\tau\}_{\tau=0}^{t-1}, \{I_\tau\}_{\tau=0}^t, Q) \qquad (1)$$

In one or more embodiments, the language-based image editing system 106 defines a state $s_t$ as the condensed representation of the term $(\{a_\tau\}_{\tau=0}^{t-1}, \{I_\tau\}_{\tau=0}^t, Q)$. Accordingly, in one or more embodiments, the language-based image editing system 106 redefines equation 1 as follows:

$$P(\{a_t\}_{t=0}^T \mid s_0) = \prod_{t=0}^T P(a_t \mid s_t) \qquad (2)$$

As shown in FIG. 4A, in one or more embodiments, to determine the policy function $P(a_t \mid s_t)$, the language-based image editing system 106 utilizes a language-to-operation neural network 400 having an encoder-decoder architecture. In particular, as shown in FIG. 4A, the language-to-operation neural network 400 includes a bi-directional long short-term memory encoder 402 and a language-to-operation decoding cell 404.

As illustrated by FIG. 4A, the language-to-operation neural network 400 utilizes the bi-directional long short-term memory encoder 402 to encode a natural language request $Q=\{x_i\}_{i=1}^L$, such as the natural language request 406. In other words, the bi-directional long short-term memory encoder 402 extracts encoded request states 408 from the natural language request 406. In one or more embodiments, an encoded request state includes an encoding corresponding to a natural language request. In particular, in some embodiments, an encoded request state includes a value or set of values related to a feature (e.g., a patent feature or a latent feature) of a natural language request. In some cases, an encoded request state includes a value or set of values generated using an encoder—such as a bi-directional long short-term memory encoder—from a natural language request.

In one or more implementations, an encoded request state includes one of a series of hidden request states $\{h_i^{enc}\}_{i=1}^{L}$. In some implementations, an encoded request state includes a final request state $m_L^{enc}$. In some embodiments, as the language-to-operation neural network 400 utilizes a bi-directional long short-term memory encoder 402 to encode a natural language request, an encoded request state can correspond to a portion of the natural language request (e.g., a word or phrase) and include a value or set of values at least partially based on one or more other portions of the natural language request.

In one or embodiments, the language-to-operation neural network 400 utilizes the bi-directional long short-term memory encoder 402 to extract the encoded request states 408 from one or more embeddings of the natural language request 406. Indeed, in some implementations, the language-based image editing system 106 generates embeddings for the natural language request 406 and generates the encoded request states 408 using the embeddings. The language-based image editing system 106 can utilize various embedding models to generate the embeddings. For instance, in some cases, the language-based image editing system 106 generates the embeddings utilizing a GloVe word embedding model. In some cases, the language-based image editing system 106 generates the embeddings utilizing a Word2vec embedding model. In further embodiments, the language-based image editing system 106 utilizes a Text2vec embedding model.

As further shown in FIG. 4A, the language-to-operation neural network 400 utilizes the encoded request states 408 corresponding to the natural language request 406 to modify a digital image 410. In particular, the language-to-operation neural network 400 utilizes the language-to-operation decoding cell 404 to modify the digital image 410 in accordance with the natural language request 406 based on the encoded request states 408.

In one or more embodiments, a language-to-operation decoding cell includes a neural network decoding component that generates a modified digital image from a digital image. In particular, in some embodiments, a language-to-operation decoding cell decoding cell includes a neural network decoding component that generates a modified digital image by performing a modification action (e.g., performing an image-modification operation using one or more corresponding operation parameters) on a digital image. For example, in some instances, as will be explained, a language-to-operation decoding cell decoding cell includes a neural network decoding component that progressively (e.g., iteratively) modifies a digital image.

Indeed, as shown in FIG. 4A, and as indicated above with reference to FIG. 3, the language-to-operation neural network 400 utilizes the language-to-operation decoding cell 404 to progressively (e.g., iteratively) modify the digital image 410 by generating one or more modified digital images. For instance, the language-to-operation neural network 400 utilizes the language-to-operation decoding cell 404 to generate the modified digital image 412. In particular, as shown, the language-to-operation decoding cell 404 generates the modified digital image 412 using the the encoded request states 408 (e.g., the encoded request state 414) and the digital image 410 (e.g., an image embedding of the digital image 410 as will be discussed below). Indeed, based on the encoded request states 408 and the digital image 410, the language-to-operation decoding cell 404 determines a first modification action 416. Further, the language-to-operation decoding cell 404 generates the modified digital image 412 by performing the first modification action 416 on the digital image 410.

As further shown in FIG. 4A, the language-to-operation decoding cell 404 generates a hidden state 418. In one or more embodiments, a hidden state includes a value generated internally within a neural network such as a language-to-operation neural network. In particular, in some embodiments, a hidden state includes an internal value or set of values generated by a particular neural network layer based on one or more values analyzed by the neural network layer. For instance, in some implementations, a hidden state includes an internal value or set of values generated by a language-to-operation decoding cell of a language-to-operation neural network using one or more values analyzed by the language-to-operation decoding cell (e.g., as opposed to a hidden request state, which is generated by a bi-directional long short-term memory encoder of the language-to-operation neural network).

Additionally, as shown in FIG. 4A, the language-to-operation neural network 400 utilizes the language-to-operation decoding cell 404 to generate the additional modified digital image 420. In particular, the language-to-operation decoding cell 404 determines a second modification action 422 using the encoded request states 408 and the modified digital image 412. The language-to-operation decoding cell 404 further generates the additional modified digital image 420 by performing the second modification action 422 on the modified digital image 412. As further shown, the language-to-operation decoding cell 404 generates the hidden state 424.

As shown in FIG. 4A, the language-to-operation decoding cell 404 further determines a third modification action 426, which includes an END action, using the additional modified digital image 420, the encoded request states 408, and the hidden state 424. Thus, in one or more embodiments, the language-to-operation neural network 400 progressively (e.g., iteratively) modifies the digital image 410 in accordance with the natural language request 406 by determining modification actions until the END action is determined for terminating the modification process.

As mentioned above, in one or more embodiments, a modification action includes an image-modification operation and one or more corresponding operation parameters. In particular, the language-to-operation decoding cell 404 performs an image-modification operation on a digital image (or modified digital image) utilizing its one or more corresponding operation parameters to generate a modified digital image (or additional modified digital image). More detail will now be provided regarding some of the image-modification operations utilized by the language-to-operation decoding cell 404 in accordance with one or more embodiments. Indeed, in some implementations, the language-to-operation decoding cell 404 selects image-modification operations from a set of pre-defined image-modification operations.

In one or more embodiments, the language-to-operation decoding cell 404 utilizes a modification action that includes a brightness operation or a saturation operation. In some cases, the language-to-operation decoding cell 404 implements the brightness operation or saturation operation by scaling the hue (H) and saturation (S) channels in the Hue Saturation Value (HSV) space using a single operation parameter—a re-scaling parameter p (e.g., an unbounded scalar). Indeed, in some cases, the language-based image editing system 106 denotes the hue, saturation, and value as H(I), S(I), and V(I), respectively. Where V'(I)=clip((1+p)·V(I), 0,1), the language-to-operation decoding cell 404 generates a modified digital image utilizing a brightness operation as follows:

$$I'=HSVtoRGB(H(I), S(I), V'(I)) \quad (3)$$

Similarly, where S'(I)=clip((1+p)·(I), 0,1), the language-to-operation decoding cell 404 generates a modified digital image utilizing a saturation operation as follows:

$$S'=HSVtoRGB(H(I), S'(I), V(I)) \quad (4)$$

In equations 3-4, the term clip(x, 0,1) represents a clip function to clip x within 0 to 1. Further, HSVtoRGB represents a differentiable function mapping the RGB space to the HSV space. For instance, in some cases, the language-to-operation decoding cell 404 utilizes the differentiable function described in Edgar Riba et al., Kornia: An Open Source Differentiable Computer Vision Library for Pytorch, In the IEEE Winter Conference on Applications of Computer Vision, pp. 3674-83, 2020, which is incorporated herein by reference in its entirety.

In some cases, the language-to-operation decoding cell 404 utilizes a modification action that includes a sharpness operation by augmenting the digital image with spatial gradients using a single operation parameter. In particular, in some cases, the language-to-operation decoding cell 404 implements the sharpness operation by adding to the digital image with its second order spatial gradient as follows:

$$I'=I+p\,\Delta^2 I \quad (5)$$

In equation 5, p represents the operation parameter—a scalar parameter. Further, $\Delta^2$ represents the Laplace operator over the spatial domain of the digital image. In one or more embodiments, the language-to-operation decoding cell 404 applies the Laplace operator to each channel of the digital image.

In some implementations, the language-to-operation decoding cell 404 utilizes a modification action that includes a contrast operation and a single operation parameter—a scalar parameter p. In some cases, to perform the contrast operation, the language-to-operation decoding cell 404 determines the luminance of a digital image as follows:

$$Lum(I)=0.27I_r+0.67I_g+0.06I_b \quad (6)$$

In equation 6, $I_r$, $I_g$ and $I_b$ represent the RGB channels of the digital image I, respectively. In some cases, the language-to-operation decoding cell 404 determines the enhanced luminance of the digital image as follows:

$$EnhancedLum(I) = \frac{1}{2}(1 - \cos(\pi \cdot Lum(I))) \quad (7)$$

In some embodiments, the language-to-operation decoding cell 404 further determines the enhanced contrast for the digital image as follows:

$$EnhancedC(I) = I \cdot \frac{EnhancedLum(I)}{Lum(I)} \quad (8)$$

Further, the language-to-operation decoding cell 404 determines the modified digital image I' resulting from the contrast operation as the combination of the enhanced contrast and the digital image I as follows:

$$I'=(1-p)\cdot I+p\cdot EnhancedC(I) \quad (9)$$

In one or more embodiments, the language-to-operation decoding cell 404 utilizes a modification action that includes a tone operation or a color operation. In some cases, the language-to-operation decoding cell 404 implements the tone operation or color operation curve estimation. In particular, the language-to-operation decoding cell 404 estimates the curve as a piece-wise linear function with N pieces. In some cases, the tone operation or color operation is associated with multiple operation parameters. In some instances, the language-to-operation decoding cell 404 defines the operation parameters as a single operation parameter $p=\{p_i\}_{i=0}^{M-1}$ so that p is a vector of length M. Where $x \in [0,1]$ represents the input pixel, the language-to-operation decoding cell 404 determines the output pixel intensity as follows:

$$f(x) = \frac{1}{Z}\sum_{i=0}^{N-1} \text{clip}(Nx - i, 0, 1)p_i \quad (10)$$

In equation 10, $$Z = \sum_{i=1}^{N-1} p_i.$$

In some cases, for the tone operation, N=M=8 and the language-to-operation decoding cell 404 applies the same f(x) to each of the RGB channels of the digital image I. For the color operation, the language-to-operation decoding cell 404 applies three different f(x) individually to each of the RGB channels. Each f(x) has N=8, which leads to M=3N=24.

As previously indicated, FIG. 4B illustrates an architecture of the language-to-operation decoding cell 404 of the language-to-operation neural network 400 of FIG. 4A in accordance with one or more embodiments.

As shown in FIG. 4B, the language-to-operation decoding cell 404 generates an image embedding 450 (represented as $v_t$) from the digital image 452 (which can include a modified digital image previously generated by the language-to-operation decoding cell 404). In one or more embodiments, an image embedding includes a value or set of values representing characteristics or features of a digital image. In particular, in some embodiments, an image embedding includes a value or set of values reflecting patent features (color values, resolution, brightness, etc.) or latent features of a digital image. For instance, in some implementations, an image embedding includes a vector of values representing a digital image. In particular, as shown, the language-to-operation decoding cell 404 generates the image embedding 450 utilizing a convolutional neural network layer 454 as $v_t = CNN(I_t)$.

As further shown in FIG. 4B, the language-to-operation decoding cell 404 generates an operation embedding 456 (represented as $o_{t-1}$) for the image-modification operation utilized during the previous time step (e.g., at time step t−1). In one or more embodiments, an operation embedding includes a value or set of values representing an image modification operation. In particular, in some implementations, an operation embedding includes a value or set of values that reflect how the image-modification operation interacts with (e.g., modifies) a digital image or values that otherwise reflect the functionality or nature of the image-modification operation. For instance, in some cases, an operation embedding includes a vector of values representing an image modification operation.

Additionally, as illustrated by FIG. 4B, the language-to-operation decoding cell 404 combines the image embedding 450 and the operation embedding 456 to generate an operation-image vector 458 (represented as $q_t$). In one or more embodiments, an operation-image vector includes a vector of values corresponding to a digital image and an image-modification operation. In particular, in some embodiments, an operation-image vector includes a vector of values representing features or characteristics associated with a digital image and/or an image-modification operation. For example, in some instances, an image-operation vector includes a vector having a first set of values representing features/characteristics of a digital image and a second set of values representing features/characteristics of an image-modification operation. To illustrate, in some implementations, the language-to-operation decoding cell 404 generates the operation-image vector 458 by concatenating the image embedding 450 and the operation embedding 456. In some instances, an image-operation vector includes one set of values that represent features/characteristics of both the digital image and the image-modification operation. For instance, in some cases, the language-to-operation decoding cell 404 generates the operation-image vector 458 by combining the image embedding 450 and the operation embedding 456 with another approach—such as by taking the average of their values, performing a dot product, etc.

As shown by FIG. 4B, the language-to-operation decoding cell 404 also utilizes a long short-term memory decoder 460 to generate a hidden state 462. In one or more embodiments, a long short-term memory decoder includes a neural network decoding component that generates hidden states. In particular, in some embodiments, a long short-term memory decoder includes a neural network decoding component that is part of a language-to-operation decoding cell and generates hidden states utilized by the language-to-operation decoding cell to modify a digital. In some implementations, a long short-term memory decoder includes one or more neural network layers that generate a hidden state based on one or more values analyzed by the long short-term memory decoder.

For example, as shown in FIG. 4B, the language-to-operation decoding cell 404 utilizes the long short-term memory decoder 460 to generate the hidden state 462 using the operation-image vector 458. Further, as shown, the language-to-operation decoding cell 404 utilizes the long short-term memory decoder 460 to generate the hidden state 462 based on a previous hidden state 464 (e.g., a hidden state from a previous time step). Indeed, in one or more embodiments, the long short-term memory decoder 460 operates to determine the following:

$$h_t^{dec}, m_t^{dec} = f(h_{t-1}^{dec}, m_{t-1}^{dec}, q_t) \quad (11)$$

In equation 11, $q_t$ represents the operation-image vector 458, as indicated above, where $q_t$=concat(Embedding($o_{t-1}$); $v_t$) and Embedding( )represents an operation embedding neural network layer learned by the language-to-operation neural network 400. As mentioned, $o_{t-1}$ represents the image-modification operation used for time step t−1, and $v_t$ represents the image embedding determined at time step t. Similarly, $h_{t-1}^{dec}$ and $m_{t-1}^{dec}$ represent the hidden state and cell state, respectively, determined at time step t−1.

In some instances, the language-to-operation decoding cell 404 does not utilize an operation embedding for some time steps. For example, when determining the first action modification to perform on the digital image provided as input to the language-to-operation neural network 400, there is no image-modification operation available from a previous time step. Accordingly, in some implementations, the language-to-operation decoding cell 404 utilizes the natural language request 406 to generate the hidden state 462 based on the image embedding 450 (e.g., rather than the operation-image vector 458). Likewise, in some cases a previous hidden state is unavailable, so the language-to-operation decoding cell 404 utilizes the long short-term memory decoder 460 to generate the hidden state 462 without using a previous hidden state.

As further shown in FIG. 4B, the language-to-operation decoding cell 404 utilizes an attention mechanism 466 to generate a state vector 468. In particular, as shown, the attention mechanism 466 generates the state vector 468 using the hidden state 462. Further, the attention mechanism 466 generates the state vector 468 using the encoded request states 408 generated from the natural language request 406. In one or more embodiments, the language-to-operation decoding cell 404 utilizes the attention mechanism 466 to determine how to implement the natural language request 406 at the current time step.

In one or more embodiments, an attention mechanism includes a neural network component that generates values that focus the neural network on one or more features. In particular, in some embodiments, an attention mechanism generates values that focus on a subset of inputs or features based on one or more hidden states. For example, in some cases, an attention mechanism generates values—such as those that are part of a state vector—to emphasize or focus on some features relative to other features. For instance, in some cases, an attention mechanism generates one or more values that focuses the neural network on a particular portion or feature of a natural language request.

As previously mentioned, in some cases, the language-based image editing system 106 defines a state $s_t$ as the condensed representation of the term $(\{a_\tau\}_{\tau=0}^{t-1}, \{I_\tau\}_{\tau=0}^{t}, Q)$ from equation 1. Accordingly, in some implementations, a state vector includes a vector of values that correspond to digital images previously used or generated (e.g., the digital image provided as input to the language-to-operation neural network 400 or any modified digital image previously generated by the language-to-operation decoding cell 404), image-modification operations that have been previously utilized, and the natural language request. In particular, in some embodiments, a state vector includes a vector of values (e.g., feature values) representing patent and/or latent features or characteristics of the those past digital images, past image-modification operations, and the natural language request.

In one or more embodiments, the language-to-operation decoding cell 404 utilizes the attention mechanism 466 as follows:

$$\beta_{ti} = \frac{\exp\left((h_t^{dec})^T h_i^{enc}\right)}{\sum_{i'=1}^{L} \exp\left((h_t^{dec})^T h_{i'}^{enc}\right)} \quad (12)$$

$$c_t = \sum_{i=1}^{L} \beta_{ti} h_i^{enc} \quad (13)$$

$$s_t = \tanh(W_c[c_t; h_t^{dec}]) \quad (14)$$

In one or more embodiments, the attention mechanism 466 incorporates features as described in U.S. patent application Ser. No. 16/411,490 filed on May 14, 2019, entitled UTILIZING DEEP RECURRENT NEURAL NETWORKS WITH LAYER-WISE ATTENTION FOR PUNCTUATION RESTORATION, the contents of which are expressly incorporated herein by reference in their entirety. In some implementations, the attention mechanism 466 incorporates features as described in Dzmitry Bandanau et al., Neural Machine Translation by Jointly Learning to Align and Translate, arXiv preprint arXiv: 1409.0473, 2014, which is incorporated herein by reference in its entirety.

As further shown in FIG. 4B, the language-to-operation decoding cell 404 utilizes an operation neural network layer 470 to determine an image-modification operation 472 to perform on the digital image 452. In one or more embodiments, an operation neural network layer includes a neural network layer that determines an image-modification operation. In particular, in some embodiments, an operation neural network layer includes a neural network layer that analyzes one or more values corresponding to a natural language request, previously used/generated digital images, and/or previously used image-modification operations, to determine an image-modification operation to perform on a digital image. Indeed, as shown in FIG. 4B, the operation neural network layer 470 determines the image-modification operation 472 based on the state vector 468. In one or more embodiments, the operation neural network layer 470 includes a fully connected neural network layer.

To provide more detail, in one or more embodiments, because the operation parameter(s) determined for use at a given time step depends on the image-modification operation determined for that time step, the language-based image editing system 106 defines the policy function $P(a_t|s_t)$ given in equation 2 as follows:

$$P(a_t|s_t) = P(o_t|s_t)P(a_t|o_t, s_t) \quad (15)$$

Accordingly, in one or more embodiments, the language-to-operation decoding cell 404 utilizes the operation neural network layer 470 to determine $P(o_t|s_t)$—that is, the image-modification operation 472. In some implementations, the operation neural network layer 470 determines the image-modification operation 472 as follows:

$$P(o_t|s_t) = \mathrm{softmax}(W_o s_t + b_o) \quad (16)$$

Additionally, as shown in FIG. 4B, the language-to-operation decoding cell 404 utilizes an operation-based neural network layer 474 to determine one or more operation parameters 476 for the image-modification operation 472. In one or more embodiments, an operation-based neural network layer includes a neural network layer that determines one or more operation parameters for a particular image-modification operation. For instance, in some cases, an operation-based neural network layer includes a neural network layer that determines one or more operation parameters based on an image modification operation and features corresponding to a natural language request, previously used/generated digital images, and/or previously used image-modification operations, to determine an image-modification operation to perform on a digital image. Indeed, as shown in FIG. 4B, the operation-based neural network layer 474 determines the one or more operation parameters 476 based on the state vector 468 and the image-modification operation 472. In one or more embodiments, the operation-based neural network layer 474 includes a fully connected neural network layer (e.g., an operation-based fully connected neural network layer).

As the various potential image-modification operations that are usable can have different parameter dimensions, the language-to-operation decoding cell 404 includes an operation-based neural network layer for each potential image-modification operation in some implementations. Accordingly, upon determining the image-modification operation to perform at a given time step, the language-to-operation decoding cell 404 utilizes the corresponding operation-based neural network layer to determine the corresponding operation parameter(s).

To provide more detail, the language-to-operation decoding cell 404 utilizes the operation-based neural network layer 474 to determine the one or more operation parameters 476 as follows:

$$a_t = W_a^{(o)} s_t + b_a^{(o)} \quad (17)$$

In equation 17, (o) represents that the operation-based neural network layer 474 includes the operation-based neural network layer that corresponds to the image-modification operation o. Accordingly, in one or more embodiments, the operation-based neural network layer 474 models the term $P(a_t|o_t, s_t)$ from equation 15 as a Gaussian distribution $\mathcal{N}(a_t; \mu_{a_t}, \sigma_{a_t})$ to determine the one or more operation parameters 476 using the following:

$$P(a_t|o_t, s_t) = \mathcal{N}(a_t; W_a^{(ot)} s_t + b_a^{(ot)}, \sigma_a) \quad (18)$$

Further, as shown in FIG. 4B, the language-to-operation decoding cell 404 utilizes an executor 478 to perform the image-modification operation 472 on the digital image 452 utilizing the one or more operation parameters 476. In one or more embodiments, an executor includes an automation program that utilizes a pre-existing digital image editing system (e.g., PHOTOSHOP) to modify the digital image based on the operation parameters 476. In particular, in some embodiments, an executor includes a set of instructions that implements an image-modification operation and its corresponding operation parameter(s) on a digital image. In particular, the executor 478 can apply the various image operations described above. By utilizing the executor 478 to modify the digital image 452, the language-to-operation decoding cell 404 generates the modified digital image 480.

As indicated above, in some implementations, the language-to-operation decoding cell 404 performs multiple iterations of determining an image-modification operation, determining one or more corresponding operation parameters, and generating a modified digital image. For instance, in some cases, the language-to-operation decoding cell 404 generates an image embedding for the modified digital image 480, generates an operation embedding for the image-modification operation 472, and repeats the process described above to perform a subsequent image-modification operation with its one or more operation parameters on the modified digital image 480 to generate an additional modified digital image. Thus, the language-to-operation neural network 400 modifies a digital image in accordance with a natural language request.

By utilizing the language-to-operation neural network, the language-based image editing system 106 can operate more flexibly than conventional systems. For instance, the language-based image editing system 106 can be deployed in a wider number of contexts, such as those where annotated data is unavailable for training the model used to modify digital images. Further, the language-based image editing system 106 flexibly handles complex (e.g., vague) requests and high-resolution digital images, which present challenges for many conventional systems, such as those using GAN-based models.

Further, the language-based image editing system 106 operates more efficiently than many conventional systems.

Indeed, as previously discussed, GAN-based models are typically data hungry, requiring a significant amount of computing resources for training and/or implementation. The language-based image editing system 106, on the other hand, require less data, and therefore consumes less computing resources.

Figure 5:
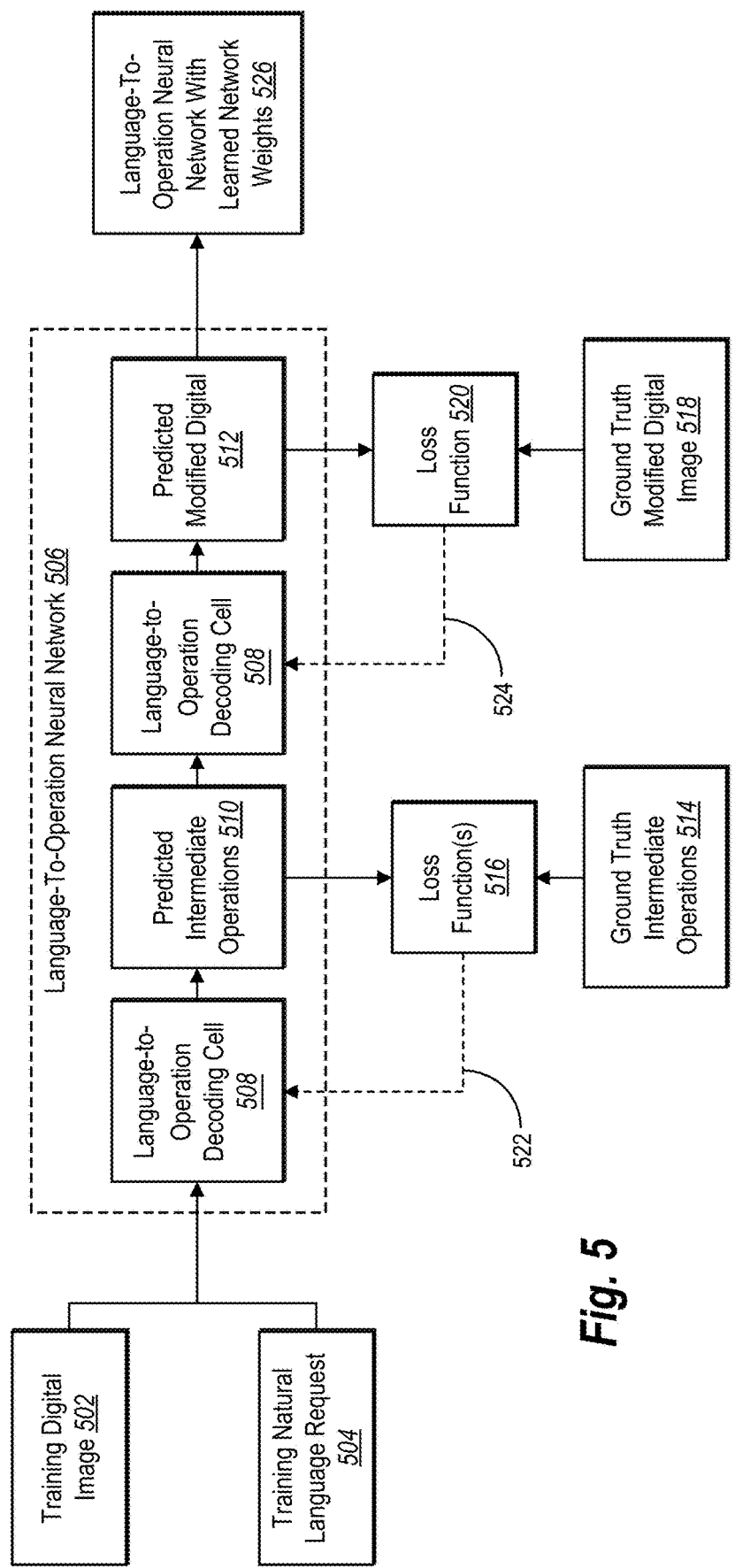
FIG. 5 illustrates a block diagram for training a language-to-operation neural network in accordance with one or more embodiments.

In one or more embodiments, the language-based image editing system 106 trains a language-to-operation neural network to modify a digital image in accordance with a natural language request. FIG. 5 illustrates a block diagram for training a language-to-operation neural network in accordance with one or more embodiments.

As shown in FIG. 5, the language-based image editing system 106 implements the training by providing a training digital image 502 and a training natural language request 504 to the language-to-operation neural network 506. Though not shown in FIG. 5, the language-based image editing system 106 utilizes an encoder of the language-to-operation neural network 506—such as a bi-directional long short-term memory encoder—to encode the training natural language request 504.

Additionally, as shown in FIG. 5, the language-based image editing system 106 utilizes the language-to-operation decoding cell 508 of the language-to-operation neural network 506 to generate predicted intermediate operations 510 based on the training digital image 502 and the training natural language request 504 (e.g., the encoded request states extracted from the training natural language request 504). In one or more embodiments, the predicted intermediate operations 510 includes predicted image-modification operations determined for modifying the training digital image 502. In some cases, the predicted intermediate operations 510 further includes predicted operation parameters that correspond to the predicted image-modification operations. In some implementations, the predicted intermediate operations 510 includes predicted modified digital images that were generated using the predicted image-modification operations and the predicted operation parameters—except for the last predicted modified digital image that is output by the language-to-operation neural network 506). Indeed, as further shown in FIG. 5, the language-based image editing system 106 utilizes the language-to-operation decoding cell 508 to generate the predicted modified digital image 512.

Further, as shown in FIG. 5, the language-based image editing system 106 compares the predicted intermediate operations 510 with ground truth intermediate operations 514 via one or more loss functions 516. The ground truth intermediate operations 514 are generated by recording the sequence of actions a user takes to edit a digital image. Alternatively, the ground truth intermediate operations 514 are synthetic ground truth operations generated to train the language-to-operation neural network. In one or more embodiments, the ground truth intermediate operations 514 includes historical operation data, such as image-modification operations and corresponding operation parameters used to implement certain modifications on a digital image. In some cases, the ground truth intermediate operations 514 includes the modified digital images (e.g., the intermediate modified digital images) resulting from those image-modification operations and operation parameters. In one or more embodiments, the language-based image editing system 106 compares a predicted image-modification operation to a ground truth image-modification operation utilizing the following loss function:

$$\mathcal{L}_o = -\sum_{t=0}^{T} \log(P(o_t^* \mid s_t)) \quad (19)$$

In some embodiments, the language-based image editing system 106 compares one or more predicted operation parameters to one or more ground truth operation parameters utilizing the following loss function:

$$\mathcal{L}_a = \sum_{t=0}^{T-1} \|\alpha_t - \alpha_t^*\|_2^2 \quad (20)$$

Additionally, as shown in FIG. 5, the language-based image editing system 106 compares the predicted modified digital image 512 with a ground truth modified digital image 518 via a loss function 520. In one or more embodiments, the ground truth modified digital image 518 includes a digital image that was correctly modified in accordance with a natural language request. In some implementations, language-based image editing system 106 utilizes the following as the loss function 520:

$$L_{L1} = \|I_T - I_g\|_1 \quad (21)$$

In equation 21, $I_T$ represents the predicted modified digital image 512 and $I_g$ represents the ground truth modified digital image 518. Thus, in one or more embodiments, the language-based image editing system 106 defines the total loss as $L = L_o + L_a + L_{L1}$.

In one or more embodiments, the language-based image editing system 106 back propagates the determined losses (i.e., errors) to the language-to-operation decoding cell 508 (as shown by the dashed lines 522, 524) to optimize the language-to-operation neural network 506 by updating its parameters. Indeed, the language-based image editing system 106 updates the weights to minimize the error of the language-to-operation neural network 506, such as the error of the language-to-operation decoding cell 508.

Though FIG. 5 illustrates training the language-to-operation neural network 506 having one refinement iteration, it should be noted that, in some embodiments, the language-based image editing system 106 trains the language-to-operation neural network 506 using multiple refinement iterations. In one or more embodiments, with each iteration of training, the language-based image editing system 106 gradually improves the accuracy with which the language-to-operation neural network 506 modifies a digital image in accordance with a natural language request. Thus, the language-based image editing system 106 generates the language-to-operation neural network with learned network weights 526.

In some implementations, to improve the sensitivity of the language-to-operation neural network 506 to natural language requests, the language-based image editing system 106 samples $a_t$ from $\mathcal{N}(a_t; \mu_{a_t}, \sigma_a)$ in equation 18 to train the image loss. Indeed, in some implementations, a default setting includes $\sigma_a = 0$ (i.e., $a_t = \mu_{a_t}$). In some cases, such a sampling produces stochastic editing results, preventing the language-to-operation neural network 506 from into one editing pattern or shortcuts regardless of the language of the natural language request. Further, as there exists multiple reasonable edits for one natural language request, $L_{L1}$ allows the stochastic modified digital images to be reasonable. In some cases, increasing $\sigma_a$ leads to higher request-sensitivity.

Figure 6:
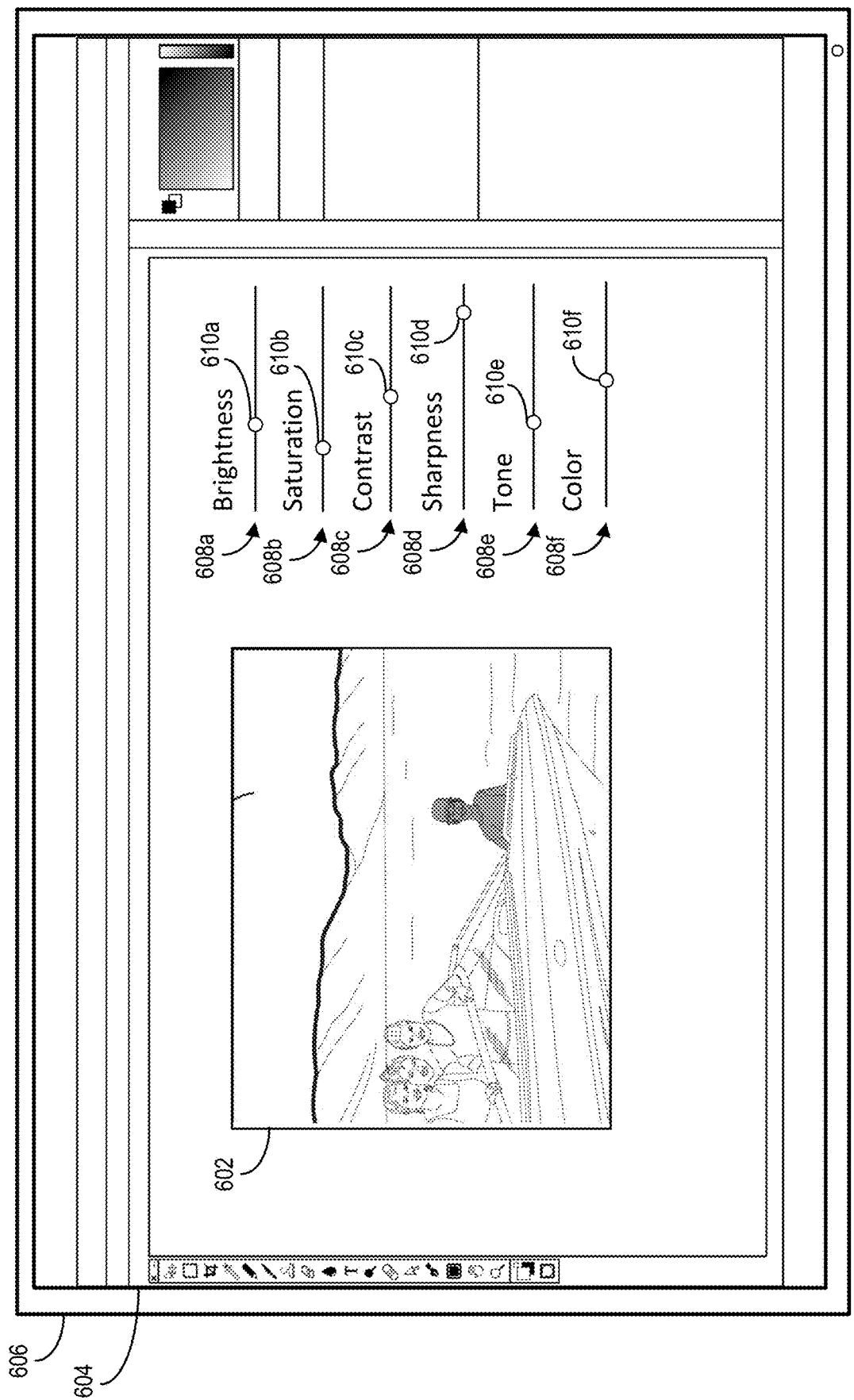
FIG. 6 illustrates a graphical user interface used by the language-based image editing system to communicate changes made to a digital image and to enable user interaction for further changes in accordance with one or more embodiments.

As previously mentioned, in one or more embodiments, the language-based image editing system 106 facilitates interpretability of changes made to a digital image in accordance with a natural language request. Further, in some cases, the language-based image editing system 106 enables user interactions for further changing a modified digital image. FIG. 6 illustrates a graphical user interface used by the language-based image editing system 106 to communicate changes made to a digital image and to enable user interaction for further changes in accordance with one or more embodiments.

As shown in FIG. 6, the language-based image editing system 106 provides a modified digital image 602 for display within a graphical user interface 604 of a client device 606. In particular, the modified digital image 602 includes a modified digital image generated in accordance with a natural language request.

As further shown, the language-based image editing system 106 provides the feature indicators 608a-608f. In one or more embodiments, the feature indicators 608a-608f indicate the features of a digital image that were modified to generate the modified digital image 602. In some instances, the feature indicators 608a-608f correspond to image-modification operations that were performed to generate the modified digital image 602 or those image-modification operations that were otherwise available for implementation.

As FIG. 6 illustrates, the feature indicators 608a-608f include the interactive feature elements 610a-610f. In particular, the interactive feature elements 610a-610f indicate the degree to which their respective features changed to generate the modified digital image 602. For example, in some cases, if the language-based image editing system 106 increased a particular feature of the digital image, the language-based image editing system 106 positions the corresponding interactive feature element further towards the right of the feature indicator. Similarly, if the language-based image editing system 106 decreased a particular feature of the digital image, the language-based image editing system 106 positions the corresponding interactive feature element further towards the left of the feature indicator. Thus, the language-based image editing system 106 provides improved interpretability by flexibly providing elements for understanding how a digital image was modified via a graphical user interface.

In some implementations, the language-based image editing system 106 detects a user interaction with one or more of the interactive operation elements 610a-610f. In particular, the language-based image editing system 106 detects that the user interaction moves an interactive operation element to the left or the right within its corresponding feature indicator. In response, the language-based image editing system 106 increases or decreases, respectively, the feature corresponding to the interactive operation element within the modified digital image 602. Thus, the language-based image editing system 106 operates more flexibly when compared to conventional systems by flexibly providing features for manually editing a modified digital image further.

As mentioned above, in one or more embodiments, the language-based image editing system 106 more accurately modifies digital images in accordance with natural language requests. Researchers have conducted studies to determine the accuracy of one or more embodiments of the language-based image editing system 106 in generating modified digital images in accordance with natural language requests. In particular, the researchers tested the effectiveness of the language-to-operation neural network utilized by the language-based image editing system 106. FIG. 7 illustrates a table reflecting experimental results regarding the effectiveness of the language-to-operation neural network utilized by the language-based image editing system 106 in accordance with one or more embodiments.

As shown in FIG. 7, the researchers compared the performance of at least one embodiment of the language-to-operation neural network (labeled "T2ONet") with the performance of various other models conventionally used to modify digital images. For instance, the table shows a comparison with the Bilinear GAN model described in Xiaofeng Mao et al., Bilinear Representation for Language-based Image Editing Using Conditional Generative Adversarial Networks, in ICASSP, 2019. The table also shows a comparison with the SISGAN model described in Hao Dong et al., Semantic Image Synthesis via Adversarial Learning, in ICCV, 2017. Further, the table shows a comparison with the TAGAN model described in Seonghyeon Nam et al., Text-adaptive Generative Adversarial Networks: Manipulating Images with Natural Language, in NeurIPS, 2018. These models typically learn mappings between a caption and a digital image without image pairs. In this evaluation, the researchers adapted the learning process for these models with a L1 loss between target and input images.

Further, as shown in FIG. 7, the table shows a comparison with the Pix2pixAug model described in Hai Wang et al., Learning to Globally Edit Images with Textual Descriptions, arXiv preprint arXiv: 1810.05786, 2018. The table also shows a comparison with the GeNeVa model—a GAN-based dialogue guided single-step editing model—described in Alaaeldin El-Nouby et al., Tell, Draw, and Repeat: Generating and Modifying Images Based on Continual Linguistic Instruction, in ICCV, 2019. The table further shows a comparison with a baseline reinforcement learning (RL) model adapted from the RL model described in Yuanming Hu et al., Exposure: A White-box Photo Post-processing Framework, in ACM Transactions on Graphics (TOG), 37(2):1-17, 2018. The researchers modified the baseline RL as they did not implement the common setting where the Q function is approximated with a neural network to make it differentiable to action; rather they approximated Q as G since $G_{t+1}$ is already differentiable to the parameter $a_t$. The "input" model shown in the table represents the evaluation between the input digital image and the target digital image.

As further shown in FIG. 7, the table compares the performance of the tested models across two datasets. In particular, the researchers compiled a large-scale language-guided global image editing dataset (labeled "MA5k-Req"). The researchers compiled the dataset by annotating language editing requests based on the MIT-Adobe 5k dataset described in Vladimir Bychkovsky et al., Learning Photographic Tonal Adjustments with a Database of Input/output Image Pairs, in CVPR, 2011. In particular, the researchers had five Photoshop experts edit each source image of the MIT-Adobe 5k dataset using five different edits. The researchers selected 4,950 unique source images and annotated each of the five edits with one natural language request, resulting in 24,750 source-target-language triplets. After filtering out words that occur less than twice, the dataset includes a vocabulary size of over nine hundred.

The table also compares performance across the GIER dataset described in Jing Shi et al., A Benchmark and Baseline for Language-driven Image Editing, arXiv preprint arXiv: 2010.02330, 2020. The researchers utilized the global editing samples, which includes 4,721 unique image pairs where each is annotated with around five natural language requests, resulting in 23,171 triplets. After filtering the words that occur less than three times, the dataset includes a vocabulary size of over two thousand.

The table shows the performance of each tested model measured in L1 distance, which directly measures the averaged pixel absolute difference between a modified digital image and the corresponding ground truth digital image as the pixel range is normalized to 0-1. The table also shows the structure similarity index (SSIM), which measures image similarity through luminance, contrast, and structure. Further, the table shows the Frechet inception distance (FID), which measures the Frechet distance between two Gaussians fitted to feature representations of the inception network over the generated digital image set and the ground truth digital image set. The table further shows the image variance $\sigma$ to measure the diversity of the resulting modified digital image conditioned on different natural language requests. In particular, the researchers applied ten different natural language requests to the same digital image to produce ten different modified digital images. The researchers then computed the variance over the ten images of all pixels and took the average overall spatial locations and color channels. The researchers further took the average of the average variance over the entire set.

To directly measure the editing quality, the researchers also implemented a user study that involved each of 250 samples from the two datasets being evaluated twice by a user. In the user study, the researchers showed the initial digital image with the natural language request, and the users blindly evaluated the modified digital images generated by the tested models as well as the target digital image. Each user scored the images on a scale of one to five (e.g., five being the best) based on the edited image quality (e.g., fidelity and aesthetics) and whether the edit accords with the natural language request. The user scores are also reflected in the table.

As illustrated by FIG. 7, the language-based image editing system 106 outperformed the other models in almost every metric used. While the language-based image editing system 106 appears to have performed poorly as measured by the image variance σ, it should be noted that image variance and the visual similarity metric L1 are typically a trade-off. Further, as shown in FIG. 7, the modified digital images generated by the language-based image editing system 106 obtain significantly higher user scores when compared to the other models.

Figure 8:
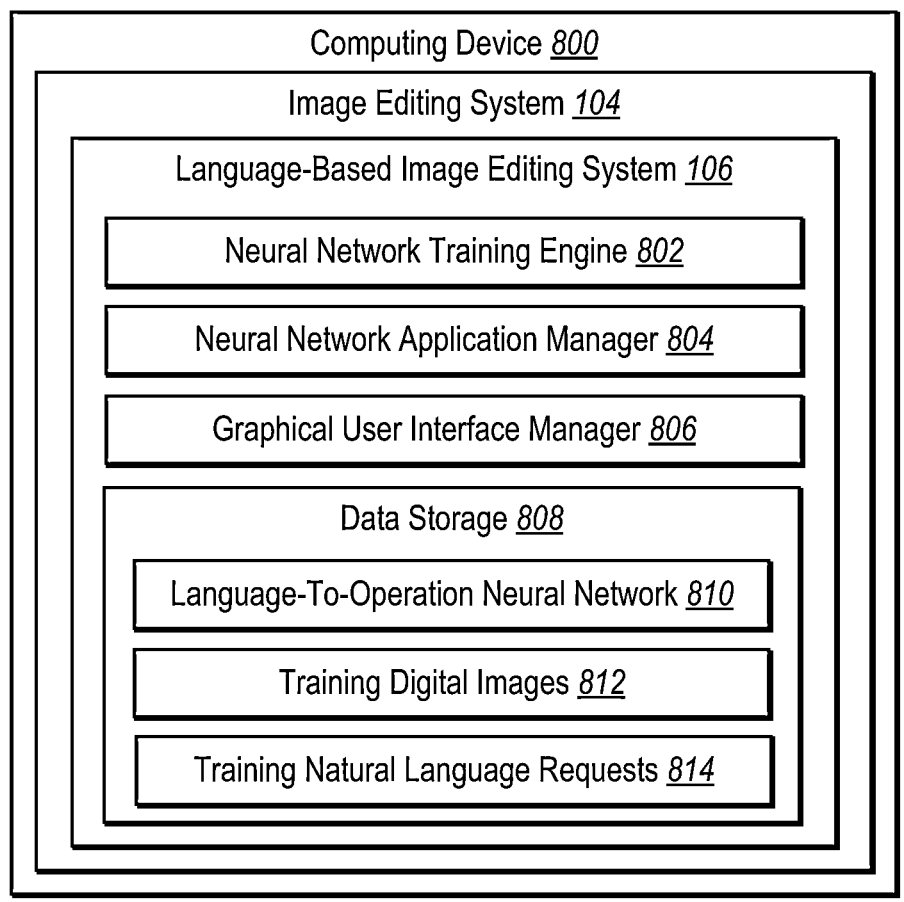
FIG. 8 illustrates an example schematic diagram of a language-based image editing system in accordance with one or more embodiments.

Turning now to FIG. 8, additional detail will now be provided regarding various components and capabilities of the language-based image editing system 106. In particular, FIG. 8 illustrates the language-based image editing system 106 implemented by the computing device 800 (e.g., the server(s) 102 and/or one of the client devices 110a-110n discussed above with reference to FIG. 1). Additionally, the language-based image editing system 106 is also part of the image editing system 104. As shown, in one or more embodiments, the language-based image editing system 106 includes, but is not limited to, a neural network training engine 802, a neural network application manager 804, a graphical user interface manager 806, and data storage 808 (which includes a language-to-operation neural network 810, training digital images 812, and training natural language requests 814).

As just mentioned, and as illustrated in FIG. 8, the language-based image editing system 106 includes the neural network training engine 802. In one or more embodiments, the neural network training engine 802 trains a language-to-operation neural network to modify digital images in accordance with natural language requests. For instance, in some cases, the neural network training engine 802 utilizes a language-to-operation neural network to predict image-modification operations, operation parameters, and resulting modified digital images. The neural network training engine 802 further compares the predictions to ground truths to determine one or more losses and utilizes those losses to update weights of the language-to-operation neural network.

As further shown in FIG. 8, the language-based image editing system 106 includes the neural network application manager 804. In one or more embodiments, the neural network application manager 804 utilizes a language-to-operation neural network trained by the neural network training engine 802 to modify digital images in accordance with natural language requests. For example, in some implementations, the neural network application manager 804 utilizes the language-to-operation neural network to determines a sequence of one or more image-modification operations and corresponding operation parameters. The neural network application manager 804 further utilizes the language-to-operation neural network to perform the sequence of image-modification operations to generate a sequence of one or more modified digital images.

Additionally, as shown in FIG. 8, the language-based image editing system 106 includes the graphical user interface manager 806. In one or more embodiments, the graphical user interface manager 806 provides a modified digital image generated by a language-to-operation neural network for display on a computing device, such as a client device. In some cases, the graphical user interface manager 806 further provides indications of the changes that were made in generating the modified digital image. Additionally, in some implementations, the graphical user interface manager 806 provides interactive elements for further editing a modified digital image.

Further, as shown, the language-based image editing system 106 includes data storage 808. In particular, data storage 808 includes the language-to-operation neural network 810, training digital images 812, and training natural language requests 814. In one or more embodiments, the 810 stores the language-to-operation neural network trained by the neural network training engine 802 and used by the neural network application manager 804. In some implementations, the training digital images 812 stores training digital images used by the neural network training engine 802 to train the language-to-operation neural network. Likewise, in some cases, the training natural language requests 814 includes training natural language requests used by the neural network training engine 802 to train the language-to-operation neural network. Though not shown in FIG. 8, in some implementations, training digital images 812 further stores the ground truth modified digital images corresponding to the training digital images and training natural language requests.

Each of the components 802-814 of the language-based image editing system 106 can include software, hardware, or both. For example, the components 802-814 can include one or more instructions stored on a computer-readable storage medium and executable by processors of one or more computing devices, such as a client device or server device. When executed by the one or more processors, the computer-executable instructions of the language-based image editing system 106 can cause the computing device(s) to perform the methods described herein. Alternatively, the components 802-814 can include hardware, such as a special-purpose processing device to perform a certain function or group of functions. Alternatively, the components 802-

814 of the language-based image editing system 106 can include a combination of computer-executable instructions and hardware.

Furthermore, the components 802-814 of the language-based image editing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-814 of the language-based image editing system 106 may be implemented as a stand-alone application, such as a desktop or mobile application. Furthermore, the components 802-814 of the language-based image editing system 106 may be implemented as one or more web-based applications hosted on a remote server. Alternatively, or additionally, the components 802-814 of the language-based image editing system 106 may be implemented in a suite of mobile device applications or "apps." For example, in one or more embodiments, the language-based image editing system 106 can comprise or operate in connection with digital software applications such as ADOBE® PHOTO SHOP® or ADOBE® LIGHTROOOM®. "ADOBE," "PHOTO SHOP," and "LIGHTROOM" are either registered trademarks or trademarks of Adobe Inc. in the United States and/or other countries.

Figure 9:
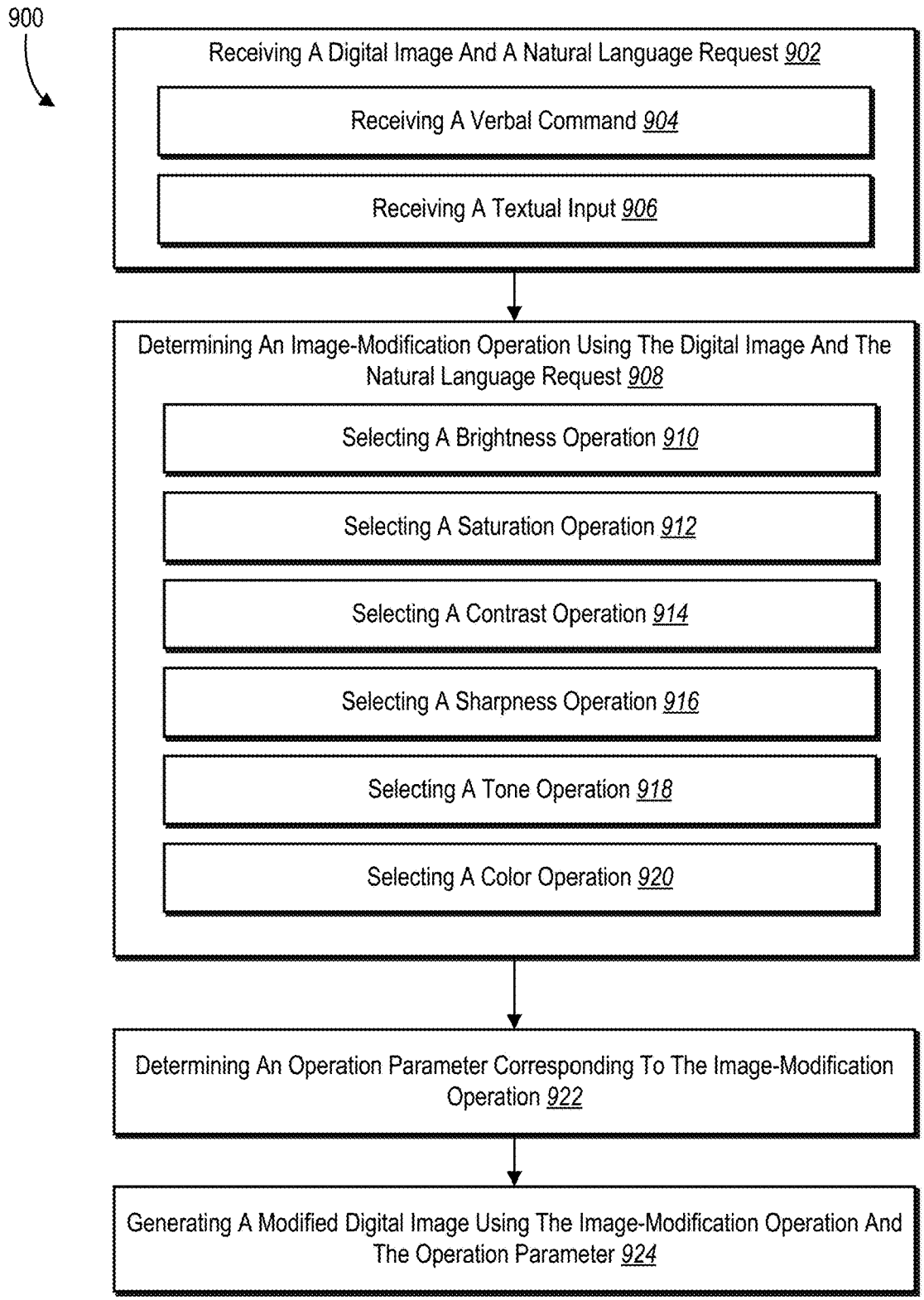
FIG. 9 illustrates a flowchart of a series of acts for modifying a digital image in accordance with a natural language request in accordance with one or more embodiments.

FIGS. 1-8, the corresponding text and the examples provide a number of different methods, systems, devices, and non-transitory computer-readable media of the language-based image editing system 106. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for modifying a digital image in accordance with a natural language request in accordance with one or more embodiments. While FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed, in a digital medium environment for editing digital images, as part of a computer-implemented method for natural language-based editing. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device comprising a language-to-operation neural network. The system further includes at least one computing device configured to cause the system to perform the acts of FIG. 9.

The series of acts 900 includes an act 902 of receiving a digital image and a natural language request. For instance, in some embodiments, the act 902 involves receiving a digital image and a natural language request for modifying the digital image.

As shown in FIG. 9, the act 902 includes a sub-act 904 of receiving a verbal command. In particular, in one or more embodiments, the language-based image editing system 106 receives a natural language request by receiving a verbal command.

As further shown in FIG. 9, the act 902 includes an alternative sub-act 906 of receiving a textual request. Indeed, in some cases, the language-based image editing system 106 receives a natural language request by receiving a textual request.

Further, the series of acts 900 includes an act 908 of determining an image-modification operation using the digital image and the natural language request. For example, in some embodiments, the act 908 involves modifying the digital image in accordance with the natural language request by utilizing a language-to-operation decoding cell of a language-to-operation neural network to determine, utilizing an operation neural network layer, an image-modification operation utilizing the digital image and the natural language request. In one or more embodiments, determining the image-modification operation utilizing the digital image and the natural language request comprises selecting the image-modification operation from a set of pre-defined image-modification operations utilizing the digital image and the natural language request. In some cases, the set of pre-defined image-modification operations comprises one or more of a brightness operation, a saturation operation, a contrast operation, a sharpness operation, a tone operation, or a color operation.

To illustrate, as shown in FIG. 9, the act 908 includes a sub-act 910 of selecting a brightness operation. Further, the act 908 includes an alternative sub-act 912 of selecting a saturation operation. The act 908 also includes an alternative sub-act 914 of selecting a contrast operation. Additionally, the act 908 includes another alternative sub-act 916 of selecting a sharpness operation. The act 908 further includes an additional alternative sub-act 918 of selecting a tone operation. Further, the act 908 includes a sub-act 920 of selecting a color operation.

In some implementations, the language-based image editing system 106 utilizes the language-to-operation neural network to generate a plurality of encoded request states for the natural language request. Accordingly, the language-based image editing system 106 determines the image-modification operation utilizing the digital image and the natural language request by generating a hidden state utilizing an image embedding for the digital image; and determining the image-modification operation utilizing the hidden state and the plurality of encoded request states for the natural language request. In some cases, determining the image-modification operation utilizing the hidden state and the plurality of encoded request states for the natural language request comprises: generating, utilizing an attention mechanism, a state vector comprising feature values corresponding to the hidden state and the plurality of encoded request states; and determining, utilizing a fully connected neural network layer, the image-modification operation based on the state vector.

Additionally, the series of acts 900 includes an act 922 of determining an operation parameter corresponding to the image-modification operation. For instance, in some embodiments, the act 922 involves modifying the digital image in accordance with the natural language request by utilizing a language-to-operation decoding cell of a language-to-operation neural network to further determine one or more operation parameters corresponding to the image-modification operation utilizing an operation-based neural network layer.

In one or more or more implementations, determining the one or more operation parameters corresponding to the image-modification operation utilizing the operation-based neural network layer comprises determining, utilizing an operation-based fully connected neural network layer, the one or more operation parameters based on the state vector and the image-modification operation.

Further, the series of acts 900 includes an act 924 of generating a modified digital image using the image-modification operation and the operation parameter. Indeed, in some cases, the act 924 involves modifying the digital image in accordance with the natural language request by utilizing a language-to-operation decoding cell of a language-to-operation neural network to further generate, utilizing an executor, a modified digital image by performing the image-modification operation on the digital image in accordance with the one or more operation parameters.

In some cases, modifying the digital image in accordance with the natural language request by utilizing the language-to-operation neural network comprises modifying the digital image utilizing a long short-term memory neural network having an encoder-decoder architecture. Indeed, in some instances, the language-based image editing system 106 utilizes a long short-term memory neural network having an encoder-decoder architecture to analyze a digital image and a natural language request and generate a modified digital image accordingly.

In one or more embodiments, the series of act 900 further includes acts for further modifying a digital image utilizing the language-to-operation neural network. In particular, the language-based image editing system 106 utilizes the language-to-operation neural network to generate one or more additional modified digital images. To illustrate, in some embodiments, the acts include modifying the digital image in accordance with the natural language request by utilizing the language-to-operation neural network to further determine an additional image-modification operation utilizing the modified digital image, the natural language request, and the image-modification operation; and generate an additional modified digital image by performing the additional image-modification operation on the modified digital image.

Indeed, to provide an illustration, in one or more embodiments, the language-based image editing system 106 receives a digital image and a natural language request for modifying the digital image; and modifies the digital image in accordance with the natural language request by utilizing a language-to-operation neural network to: determine a first image-modification operation and a first operation parameter utilizing the digital image and the natural language request; generate a modified digital image by performing the first image-modification operation on the digital image in accordance with the first operation parameter; determine a second image-modification operation and a second operation parameter utilizing the modified digital image, the natural language request, and the first image-modification operation; and generate an additional modified digital image by performing the second image-modification operation on the modified digital image in accordance with the second operation parameter.

In some cases, the language-based image editing system 106 further utilizes the language-to-operation neural network to: generate a plurality of encoded request states from the natural language request; and generate an operation-image vector by combining an image embedding corresponding to the modified digital image and an operation embedding corresponding to the first image-modification operation. Accordingly, in some embodiments, the language-based image editing system 106 determines the second image-modification operation and the second operation parameter utilizing the modified digital image, the natural language request, and the first image-modification operation by determining the second image-modification operation and the second operation parameter utilizing the plurality of encoded request states and the operation-image vector.

In some cases, the language-based image editing system 106 modifies the digital image in accordance with the natural language request by further utilizing the language-to-operation neural network to: determine a third image-modification operation and a third operation parameter utilizing the additional modified digital image, the natural language request, the first image-modification operation, and the second image-modification operation; and generate a further modified digital image by performing the third image-modification operation on the additional modified digital image in accordance with the third operation parameter.

In some implementations, the language-based image editing system 106 determines the first image-modification operation by selecting the first image-modification operation from a set of pre-defined image-modification operations; and determines the second image-modification operation by selecting the first image-modification operation from the set of pre-defined image-modification operations, the second image-modification operation differing from the first image-modification operation. Further, in some cases, the language-based image editing system 106 determines the first operation parameter utilizing a first operation-based neural network layer that corresponds to the first image-modification operation; and determines the second operation parameter utilizing a second operation-based neural network layer that corresponds to the second image-modification operation, the second operation-based neural network layer differing from the first operation-based neural network layer.

Indeed, in one or more embodiments, the language-based image editing system 106 utilizes a language-to-operation neural network to modify digital images in accordance with natural language requests. In some instances, a language-to-operation neural network includes a bi-directional long short-term memory encoder that extracts encoded request states from a natural language request. Further, the language-to-operation neural network includes a language-to-operation decoding cell comprising: a long short-term memory decoder that generates a hidden state utilizing an image embedding of a digital image; an operation neural network layer that determines an image-modification operation utilizing the hidden state and the encoded request states; an operation-based neural network layer that determines one or more operation parameters corresponding to the image-modification operation; and an executor that generates a modified digital image by performing the image-modification operation on the digital image in accordance with the one or more operation parameters.

In some cases, the language-to-operation decoding cell comprises an attention mechanism that generates a state vector from the hidden state and the encoded request states, the state vector comprising feature values corresponding to the digital image and the natural language request; and the operation neural network layer determines the image-modification operation utilizing the hidden state and the encoded request states by determining the image-modification operation utilizing the state vector. Further, in some embodiments, the operation-based neural network layer determines the one or more operation parameters corresponding to the image-modification operation by determining the one or more operation parameters utilizing the image-modification operation and the state vector.

In one or more embodiments, the language-to-operation decoding cell comprises a convolutional neural network layer that generates the image embedding from the digital image. Further, in some cases, the language-to-operation decoding cell comprises an additional operation-based neural network layer that determines an operation parameter corresponding to an additional image-modification operation that differs from the image-modification operation.

Accordingly, in some implementations, the series of acts 900 includes acts for utilizing the language-to-operation neural network. For example, in some cases, the acts include generating, utilizing the language-to-operation neural network, at least one modified digital image utilizing at least one digital image and at least one natural language request.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
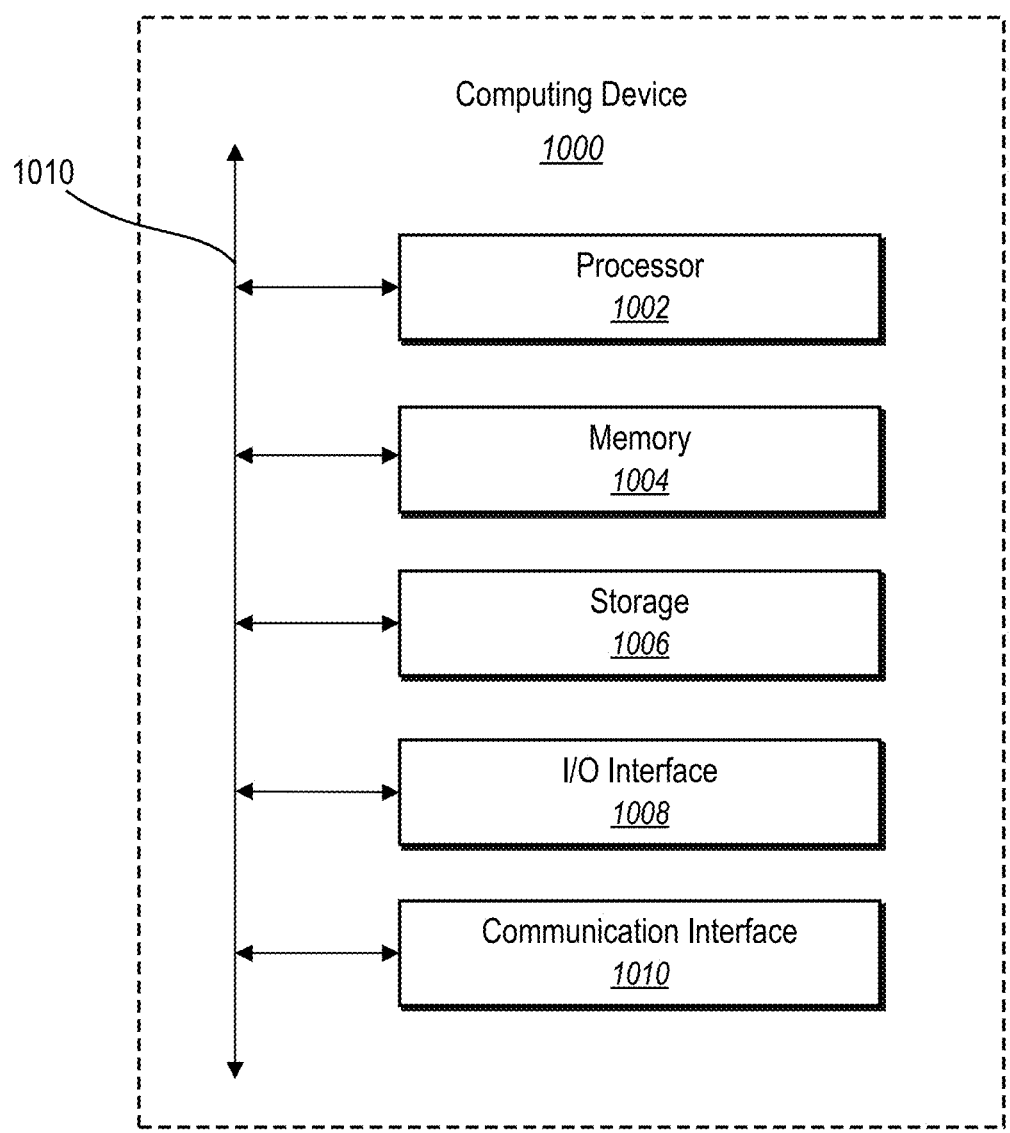
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102 and/or the client devices 110a-110n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for editing digital images, a computer-implemented method for natural language-based editing comprising:
  receiving a digital image and a natural language request for modifying the digital image; and
  modifying the digital image in accordance with the natural language request by utilizing a language-to-operation decoding cell of a language-to-operation neural network to:
    determine, utilizing an operation neural network layer, an image-modification operation utilizing the digital image and the natural language request;

determine one or more operation parameters corresponding to the image-modification operation utilizing an operation-based neural network layer; and generate, utilizing an executor, a modified digital image by performing the image-modification operation on the digital image in accordance with the one or more operation parameters.

2. The computer-implemented method of claim 1, further comprising modifying the digital image in accordance with the natural language request by utilizing the language-to-operation neural network to:

determine an additional image-modification operation utilizing the modified digital image, the natural language request, and the image-modification operation; and generate an additional modified digital image by performing the additional image-modification operation on the modified digital image.

3. The computer-implemented method of claim 1, further comprising utilizing the language-to-operation neural network to generate a plurality of encoded request states for the natural language request, wherein determining the image-modification operation utilizing the digital image and the natural language request comprises:

generating a hidden state utilizing an image embedding for the digital image; and determining the image-modification operation utilizing the hidden state and the plurality of encoded request states for the natural language request.

4. The computer-implemented method of claim 3, wherein determining the image-modification operation utilizing the hidden state and the plurality of encoded request states for the natural language request comprises:

generating, utilizing an attention mechanism, a state vector comprising feature values corresponding to the hidden state and the plurality of encoded request states; and determining, utilizing a fully connected neural network layer, the image-modification operation based on the state vector.

5. The computer-implemented method of claim 4, wherein determining the one or more operation parameters corresponding to the image-modification operation utilizing the operation-based neural network layer comprises determining, utilizing an operation-based fully connected neural network layer, the one or more operation parameters based on the state vector and the image-modification operation.

6. The computer-implemented method of claim 1, wherein receiving the natural language request for modifying the digital image comprises receiving a verbal command.

7. The computer-implemented method of claim 1, wherein modifying the digital image in accordance with the natural language request by utilizing the language-to-operation neural network comprises modifying the digital image utilizing a long short-term memory neural network having an encoder-decoder architecture.

8. The computer-implemented method of claim 1, wherein determining the image-modification operation utilizing the digital image and the natural language request comprises selecting the image-modification operation from a set of pre-defined image-modification operations utilizing the digital image and the natural language request.

9. The computer-implemented method of claim 8, wherein the set of pre-defined image-modification operations comprises one or more of a brightness operation, a saturation operation, a contrast operation, a sharpness operation, a tone operation, or a color operation.

10. A non-transitory computer-readable medium storing instructions thereon that, when executed by at least one processor, cause a computing device to:

receive a digital image and a natural language request for modifying the digital image; and modify the digital image in accordance with the natural language request by utilizing a language-to-operation neural network to:

determine a first image-modification operation and a first operation parameter utilizing the digital image and the natural language request;

generate a modified digital image by performing the first image-modification operation on the digital image in accordance with the first operation parameter;

determine a second image-modification operation and a second operation parameter utilizing the modified digital image, the natural language request, and the first image-modification operation; and generate an additional modified digital image by performing the second image-modification operation on the modified digital image in accordance with the second operation parameter.

11. The non-transitory computer-readable medium of claim 10, further comprising instructions that, when executed by the at least one processor, cause the computing device to utilize the language-to-operation neural network to:

generate a plurality of encoded request states from the natural language request; and generate an operation-image vector by combining an image embedding corresponding to the modified digital image and an operation embedding corresponding to the first image-modification operation.

12. The non-transitory computer-readable medium of claim 11, wherein the instructions, when executed by the at least one processor, cause the computing device to determine the second image-modification operation and the second operation parameter utilizing the modified digital image, the natural language request, and the first image-modification operation by determining the second image-modification operation and the second operation parameter utilizing the plurality of encoded request states and the operation-image vector.

13. The non-transitory computer-readable medium of claim 10 further comprising instructions that, when executed by the at least one processor, cause the computing device to modify the digital image in accordance with the natural language request by utilizing the language-to-operation neural network to:

determine a third image-modification operation and a third operation parameter utilizing the additional modified digital image, the natural language request, the first image-modification operation, and the second image-modification operation; and generate a further modified digital image by performing the third image-modification operation on the additional modified digital image in accordance with the third operation parameter.

14. The non-transitory computer-readable medium of claim 10, wherein the instructions, when executed by the at least one processor, cause the computing device to:

determine the first image-modification operation by selecting the first image-modification operation from a set of pre-defined image-modification operations; and determine the second image-modification operation by selecting the first image-modification operation from the set of pre-defined image-modification operations, the second image-modification operation differing from the first image-modification operation.

15. The non-transitory computer-readable medium of claim 10, wherein the instructions, when executed by the at least one processor, cause the computing device to:
determine the first operation parameter utilizing a first operation-based neural network layer that corresponds to the first image-modification operation; and
determine the second operation parameter utilizing a second operation-based neural network layer that corresponds to the second image-modification operation, the second operation-based neural network layer differing from the first operation-based neural network layer.

16. A system comprising:
at least one memory device comprising a language-to-operation neural network comprising:
a bi-directional long short-term memory encoder that extracts encoded request states from a natural language request; and
a language-to-operation decoding cell comprising:
a long short-term memory decoder that generates a hidden state utilizing an image embedding of a digital image;
an operation neural network layer that determines an image-modification operation utilizing the hidden state and the encoded request states;
an operation-based neural network layer that determines one or more operation parameters corresponding to the image-modification operation; and
an executor that generates a modified digital image by performing the image-modification operation on the digital image in accordance with the one or more operation parameters; and
at least one computing device configured to cause the system to generate, utilizing the language-to-operation neural network, at least one modified digital image utilizing at least one digital image and at least one natural language request.

17. The system of claim 16, wherein:
the language-to-operation decoding cell comprises an attention mechanism that generates a state vector from the hidden state and the encoded request states, the state vector comprising feature values corresponding to the digital image and the natural language request; and
the operation neural network layer determines the image-modification operation utilizing the hidden state and the encoded request states by determining the image-modification operation utilizing the state vector.

18. The system of claim 17, wherein the operation-based neural network layer determines the one or more operation parameters corresponding to the image-modification operation by determining the one or more operation parameters utilizing the image-modification operation and the state vector.

19. The system of claim 16, wherein the language-to-operation decoding cell comprises a convolutional neural network layer that generates the image embedding from the digital image.

20. The system of claim 16, the language-to-operation decoding cell comprises an additional operation-based neural network layer that determines an operation parameter corresponding to an additional image-modification operation that differs from the image-modification operation.

* * * * *